US012435558B2

(12) United States Patent
Fitzgibbon et al.

(10) Patent No.: US 12,435,558 B2
(45) Date of Patent: Oct. 7, 2025

(54) SYSTEM AND METHODS FOR CONTROLLING A MOVABLE BARRIER OPERATOR

(71) Applicant: The Chamberlain Group LLC, Oak Brook, IL (US)

(72) Inventors: James Joseph Fitzgibbon, Batavia, IL (US); Garth Wesley Hopkins, Lisle, IL (US); Oddy Khamharn, Lombard, IL (US); Adelaide Zhang, Northbrook, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 450 days.

(21) Appl. No.: 17/845,352

(22) Filed: Jun. 21, 2022

(65) Prior Publication Data

US 2022/0403693 A1 Dec. 22, 2022

Related U.S. Application Data

(60) Provisional application No. 63/213,071, filed on Jun. 21, 2021.

(51) Int. Cl.
*E05F 15/73* (2015.01)
*E05F 15/77* (2015.01)

(52) U.S. Cl.
CPC .............. *E05F 15/73* (2015.01); *E05F 15/77* (2015.01); *E05Y 2400/664* (2013.01); *E05Y 2400/858* (2013.01); *E05Y 2900/106* (2013.01)

(58) Field of Classification Search
CPC ........... E05F 15/73; E05F 15/77; E05F 15/79; E05Y 2400/664; E05Y 2400/858; E05Y 2900/106; E05Y 2400/81
See application file for complete search history.

(56) References Cited

U.S. PATENT DOCUMENTS

| | | | |
|---|---|---|---|
| 5,555,502 | A | 9/1996 | Opel |
| 5,899,956 | A | 5/1999 | Chan |

(Continued)

FOREIGN PATENT DOCUMENTS

| | | |
|---|---|---|
| WO | 1996035119 | 11/1996 |
| WO | 03057523 | 7/2003 |
| WO | 2004058540 | 7/2004 |

OTHER PUBLICATIONS

Alarm.com, "Meet the Alarm.com Mobile App" YouTube Video (screenshot), Jul. 30, 2020, Alarm.com, https://www.youtube.com/watch?v=IYQh8OaAp1E (Year: 2020).*

(Continued)

*Primary Examiner* — Christopher W Carter
(74) *Attorney, Agent, or Firm* — Dority & Manning, P.A.

(57) ABSTRACT

In one respect, a method of controlling a movable barrier operator including receiving, via communication circuitry of an in-vehicle device, a wireless signal indicating communication of a state change request to the movable barrier operator, the state change request configured to cause the movable barrier operator to move a movable barrier from a first state toward a second state; presenting, via a user interface of the in-vehicle device, a notification of the communication of the state change request and an option to cancel the state change request; receiving, via the user interface of the in-vehicle device, a user input to cancel the state change request; and effecting cancelation of the state change request in response to the user interface receiving the user input to the cancel the state change operation.

23 Claims, 15 Drawing Sheets

(56) References Cited

U.S. PATENT DOCUMENTS

| | | | |
|---|---|---|---|
| 6,158,655 A | 12/2000 | DeVries, Jr. | |
| 6,166,698 A | 12/2000 | Turnbull | |
| 6,400,956 B1 | 6/2002 | Richton | |
| 6,411,887 B1 | 6/2002 | Martens | |
| 6,434,450 B1 | 8/2002 | Griffin, Jr. | |
| 6,476,732 B1 | 11/2002 | Stephan | |
| 6,487,495 B1 | 11/2002 | Gale | |
| 6,526,335 B1 | 2/2003 | Treyz | |
| 6,559,775 B1 | 5/2003 | King | |
| 6,690,268 B2 | 2/2004 | Schofield | |
| 6,707,421 B1 | 3/2004 | Drury | |
| 6,708,086 B2 | 3/2004 | Richard | |
| 6,711,474 B1 | 3/2004 | Treyz | |
| 6,791,472 B1 | 9/2004 | Hoffberg | |
| 6,812,942 B2 | 11/2004 | Ribak | |
| 6,856,820 B1 | 2/2005 | Kolls | |
| 6,940,492 B2 | 9/2005 | Maritzen | |
| 6,978,206 B1 | 12/2005 | Pu | |
| 6,988,026 B2 | 1/2006 | Breed | |
| 7,103,460 B1 | 9/2006 | Breed | |
| 7,158,881 B2 | 1/2007 | McCarthy | |
| 7,224,324 B2 | 5/2007 | Quist | |
| 7,257,426 B1 | 8/2007 | Witkowski | |
| 7,272,497 B2 | 9/2007 | Koshiji | |
| 7,298,289 B1 | 11/2007 | Hoffberg | |
| 7,386,318 B2 | 6/2008 | Moon | |
| 7,415,243 B2 | 8/2008 | Yuhara | |
| 7,440,845 B1 | 10/2008 | Laverick | |
| 7,532,965 B2 | 5/2009 | Robillard | |
| 8,525,723 B2 | 9/2013 | Orr | |
| 8,611,919 B2 | 12/2013 | Barnes, Jr. | |
| 10,127,384 B2 | 11/2018 | Shah | |
| 10,837,217 B2 | 11/2020 | Cate | |
| 10,846,956 B2 | 11/2020 | Cate | |
| 10,873,828 B2 | 12/2020 | Lau | |
| 2002/0055924 A1 | 5/2002 | Liming | |
| 2002/0085043 A1 | 7/2002 | Ribak | |
| 2002/0147006 A1 | 10/2002 | Coon | |
| 2002/0173889 A1 | 11/2002 | Odinak | |
| 2002/0193946 A1 | 12/2002 | Turnbull | |
| 2003/0006888 A1 | 1/2003 | Burchette | |
| 2003/0007261 A1 | 1/2003 | Hutzel | |
| 2003/0055557 A1 | 3/2003 | Dutta | |
| 2003/0182026 A1 | 9/2003 | Awada | |
| 2003/0197594 A1 | 10/2003 | Olson | |
| 2003/0197595 A1 | 10/2003 | Olson | |
| 2004/0034455 A1 | 2/2004 | Simonds | |
| 2004/0093154 A1 | 5/2004 | Simonds | |
| 2004/0110472 A1 | 6/2004 | Witkowski | |
| 2004/0158371 A1 | 8/2004 | Iggulden | |
| 2004/0246607 A1 | 12/2004 | Watson | |
| 2006/0041373 A1 | 2/2006 | Rowe | |
| 2006/0050018 A1 | 3/2006 | Hutzel | |
| 2009/0072987 A1* | 3/2009 | Styers | G08B 13/19695 340/686.1 |
| 2015/0084750 A1* | 3/2015 | Fitzgibbon | G08C 17/02 340/12.29 |
| 2019/0048639 A1* | 2/2019 | Lickfelt | G01S 19/51 |
| 2020/0181969 A1* | 6/2020 | Fitzgibbon | G07C 9/00571 |
| 2020/0248496 A1* | 8/2020 | Riesebosch | E05F 15/77 |
| 2021/0019964 A1 | 1/2021 | Cate | |
| 2021/0123288 A1 | 4/2021 | Cate | |

OTHER PUBLICATIONS

Arunas Stockus et al.; Integrating GPS Data Within Embedded Internet GIS; GIS '99: Proceedings of the 7th ACM International Symposium on Advances in Geographic Information Systems, pp. 134-139. Date of Publication: Nov. 1999.

Chatschik Bisdikian et al.; Intelligent Pervasive Middleware for Context-Based and Localized Telematics Services; WMC '02: Proceedings of the 2nd international workshop on Mobile commerce, pp. 15-24; Date of Publication: Sep. 2002.

Erwin R. Boer and Michael A. Goodrich; Interfaces, autonomy, & interactions in automobile driving; CHI EA '04: CHI 04 Extended Abstracts on Human Factors in Computing Systems, pp. 1578-1579 Date of Publication: Apr. 2004.

Fitz Hohl et al.; Next century challenges: Nexus—an open global infrastructure for spatial-aware applications; MobiCom '99: Proceedings of the 5th Annual ACM/IEEE International Conference on Mobile Computing and Networking, pp. 249-255; Date of Publication: Aug. 1999.

Image of Tesla Model 3 screen showing a Homelink® icon on the screen. The Tesla Model 3 was publicly available at least as early as Jun. 20, 2021, 1 page.

Mohamed F. Mokel et al.; Towards scalable location-aware services: requirements and research issues; GIS '03: Proceedings of the 11th ACM international symposium on Advances in geographic information systems, pp. 110-117 Date of Publication: Nov. 2003.

Wayback Machine, Archive of https://www.myq.com/auto , dated Sep. 22, 2020, 1 page.

* cited by examiner

SYSTEM AND METHODS FOR CONTROLLING A MOVABLE BARRIER OPERATOR

CROSS-REFERENCE TO RELATED APPLICATION

This application claims the benefit of U.S. Provisional Patent Application No. 63/213,071, filed Jun. 21, 2021, which is incorporated by reference in its entirety herein.

FIELD

This disclosure relates to movable barrier operator systems and, in particular, to control of a movable barrier operator from a remote device.

BACKGROUND

Vehicles are known that facilitate control of a state of a garage door. Some vehicles include touchscreen displays that permit a user to change the state of a movable barrier via the display. The user provides user input to a display, then a communication system of the vehicle communicates a state change request to the garage door operator via a network, such as a cellular or Wi-Fi network, to cause the garage door operator to change the state of the garage door.

Some vehicles are further configured to monitor the location of a vehicle relative to an associated garage door operator. The vehicle may automatically send a state change command to cause the garage door operator to open or close the garage door based on the relative proximity of the vehicle to a specified or predetermined location such as, for example, the garage door operator and/or garage door. For example, when the vehicle is determined to be within a predetermined distance of a particular location e.g., a garage in which the user/driver parks and/or stores the vehicle, the vehicle may automatically send a state change command to open the garage door if the garage door is closed. Similarly, when the vehicle is determined to be more than a predetermined distance away from the garage when departing the specified or predetermined location, the vehicle may send a control signal to close the garage door. However, these systems may open or close the garage door even when a user does not desire the garage door be opened or closed—for example, when a user's vehicle is determined to be passing in proximity to the garage but is not stopping at the garage or entering the garage. Or, when the user's vehicle drives away from the garage, but desires the garage door to remain open for others who are still using the garage or for another of the user's vehicles that may be driven by a family member who is arriving shortly.

DETAILED DESCRIPTION

In one aspect of the present disclosure, a system is provided for enabling a user to override, e.g., cancel or stop, an in-vehicle device from autonomously or automatically changing the state of the movable barrier such as due to the user's vehicle crossing a geofence or being determined proximate to a predetermined or specified location. The movable barrier operator may receive a state change command from a server computer that operates as an intermediary between the in-vehicle device and the movable barrier operator. Where the state change command is received from a user device that is not determined to be in proximity to the movable barrier operator, the movable barrier operator enters a prewarning mode where a notification apparatus is used provide a prewarning to alert those in proximity to the movable barrier that the door is about to move. The movable barrier operator may also send a notification message to the in-vehicle device and/or other user devices that have been associated with the movable barrier operator that the movable barrier operator is about to change the state of the movable barrier. The in-vehicle device, such as an infotainment system or digital dashboard, may notify the user that the movable barrier operator is about to and/or is changing the state of the movable barrier.

The in-vehicle device may provide the user with an option to cancel the state change operation. If the server computer receives an indication from the in-vehicle device that the user wants to cancel the state change operation, the server computer sends a cancel message to the movable barrier operator which cancels the operation of the movable barrier operator. If the movable barrier operator is still in the prewarning mode, the movable barrier operator exits the prewarning mode, refrains from actuation to prevent movement of the movable barrier, and returns to an operating mode wherein the movable barrier operator awaits the next state change command. If the movable barrier operator is currently executing the state change command and moving the movable barrier in response thereto, the movable barrier operator stops movement of the movable barrier for a period of time (e.g., 0.5 seconds), before reversing the direction of movement of the movable barrier. For instance, if the movable barrier was in an open state and is traveling toward the closed state, upon receiving the cancel message from the server computer, the movable barrier operator may reverse the direction of the movable barrier and restore or return the movable barrier back to the open state.

Figure 1:
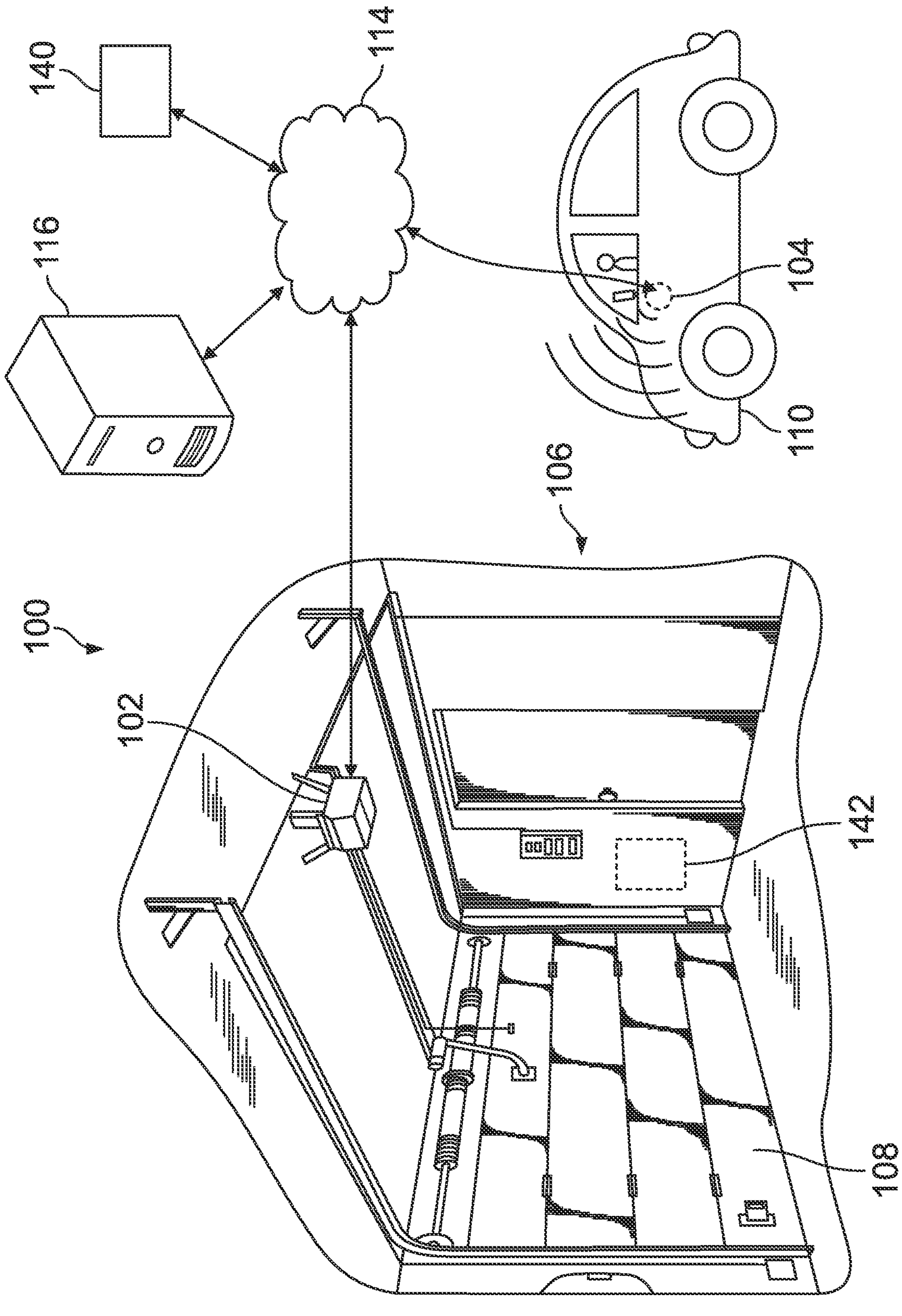
FIG. 1 is an example schematic representation of a system for controlling operation of a movable barrier operator with an in-vehicle device.

With respect to FIG. 1, an example system 100 is provided for controlling a movable barrier operator 102 from an in-vehicle device 104 and, in particular, for facilitating a user to cancel a state change operation of the movable barrier operator 102. The movable barrier operator 102 may be installed at a secured area, such as a garage 106, and be coupled to and configured to move a movable barrier 108, such as a garage door, to permit ingress and egress to the secured area. Examples of movable barrier operators include chain or belt-driven garage door openers, gate operators, roller shutter systems, and jackshaft garage door operators.

The in-vehicle device 104 may be part of, mounted to, or carried in the vehicle 110. The in-vehicle device 104 may include a user interface such as a human machine interface 136 (see FIG. 3) for notifying a user when the movable barrier operator is changing states and for receiving commands from a user for controlling the movable barrier operator 102. The in-vehicle device 104 may include, for example, an infotainment system or an electronic dashboard of the vehicle 110 or a portable electronic device such as a smartphone.

The in-vehicle device 104 may communicate with the movable barrier operator 102 directly via radio frequency signals (e.g., signals in the 300-900 MHz range or signals utilizing a Bluetooth® protocol) and/or indirectly via a network 114. The network 114 may include one or more networks such as the internet, wide area networks such as 3G, 4G, 4G LTE, 5G cellular networks, and/or low power wide area network technologies such as WiMAX, LoRaWAN, and LTE-M. The movable barrier operator 102 may be associated with a remote computer 116 (e.g., a server computer) on the network 114 that facilitates communication between the in-vehicle device 104 and the movable barrier operator 102 via the network 114. The in-vehicle device 104 may communicate state change commands to the movable barrier operator 102 by sending a state change request to the remote computer 116 over the network 114. The remote computer 116 may process the state change request and send a command to the movable barrier operator 102. The movable barrier operator 102 may also communicate information regarding the state of the movable barrier operator 102 to the in-vehicle device 104 via the network 114, such as a current state of the movable barrier operator 102, a change of state of the movable barrier 108, and/or a direction of movement (e.g., opening/upward-moving, closing/downward-moving, stopped, etc.) of the movable barrier 108.

One or more user devices 140, such as a mobile communication device e.g. smartphone, wearable e.g. smart watch, laptop, tablet computer, desktop computer, or another in-vehicle device, may also be configured to communicate with the remote computer 116 via the network 114. The one or more user devices 140 may be associated with the movable barrier operator 102, for example via a user account of an application, and be configured to communicate state change requests to the movable barrier operator 102. The user devices 140 may also receive information regarding the movable barrier 108 such as notifications or alerts when the state of the movable barrier 108 is being changed. Users may be able to navigate to a graphical user interface of the client application associated with the movable barrier operator 102 on the user device 140 to view the status of an associated movable barrier 108 (e.g., whether the movable barrier 108 is open or closed).

Figure 2:
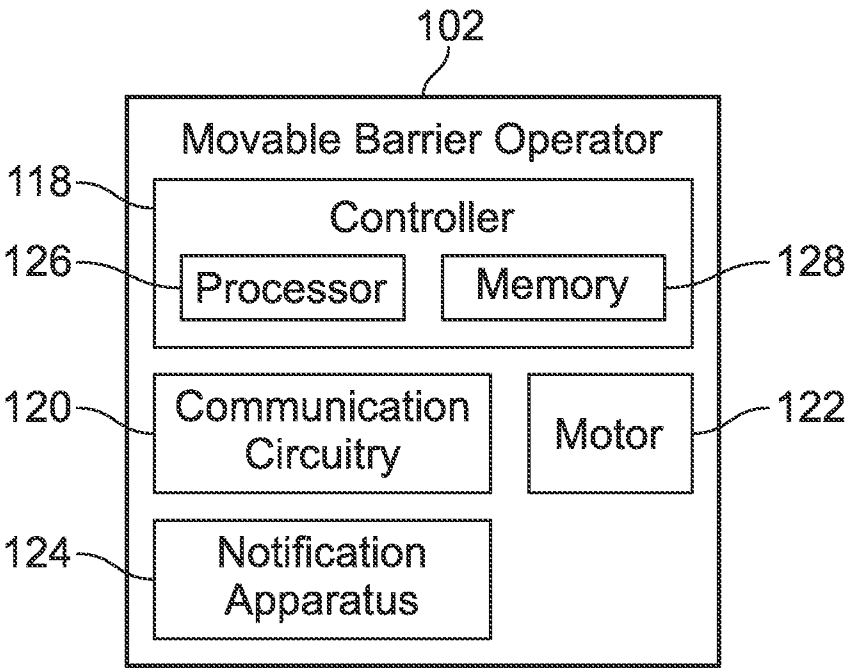
FIG. 2 is a block diagram of the movable barrier operator of FIG. 1.

With respect to FIG. 2, the movable barrier operator 102 includes a controller 118, communication circuitry 120, a motor 122, and a notification apparatus 124. The controller 118 includes a processor 126 and a memory 128 and is configured to carry out the functionality of the movable barrier operator 102. The memory 128 may store computer-readable instructions for use by the processor 126 to carry out operations, such as the state change operations and prewarning operations. The memory 128 may also store a database of learned transmitters from which the movable barrier operator 102 will operate upon receipt of a state change command. The processor 126 may receive state changes requests and cause the motor 122 to operate to move the movable barrier 108 between open and closed positions. The motor 122 may be coupled to the movable barrier 108 such that operation of the motor 122 causes the movable barrier 108 to move.

The communication circuitry 120 may include a transceiver configured to communicate with remote control devices via radio frequency signals to control the operation of the movable barrier operator 102. Upon receipt of a state change command from a learned transmitter of a remote-control device, the movable barrier operator 102 may determine to change the state of the movable barrier 108.

The communication circuitry 120 may further be configured to communicate via the network 114. The communication circuitry 120 enables the movable barrier operator 102 to communicate with other devices via the network 114. For example, the movable barrier operator 102 may communicate the current state of the movable barrier 108 to the remote computer 116. This enables a user to determine the state of the movable barrier 108 remotely, for example, on a user device 140 (e.g., smartphone, personal computer, smart watch, vehicle infotainment system) via an application associated with the movable barrier operator 102 that communicates with the remote computer 116. The movable barrier operator 102 may also receive state change commands from the remote computer 116. For example, a user may select to change the state of the movable barrier operator 102 using the application (e.g. browser, or other native or user-installed client software app) on the user device 140. This user selection of a state change may send a signal to the remote computer 116 via the network 114 which causes a signal including the state change command to be sent to the movable barrier operator 102 via the network 114.

The movable barrier operator 102 may include a notification apparatus 124 configured to provide a prewarning to alert those in proximity to the movable barrier operator 102 and/or the movable barrier 108 that the movable barrier 108 is about to move and change states. The notification apparatus 124 may include a light, a speaker, and/or a buzzer as some examples. When the movable barrier operator 102 receives a state change request and a prewarning is to be provided, the movable barrier operator 102 may activate the notification apparatus 124 for a period of time (e.g., 5 seconds) to provide a prewarning before operating the motor 122 to cause the movable barrier 108 to move. The prewarning provided by the notification apparatus 124 may include flashing or strobing the light, and/or generating an alarm sound using the speaker and/or buzzer to alert the user that the movable barrier 108 will be moving. The alarm sound may be, as examples, a series of beeps, a buzzing noise, and/or a recorded message played via the speaker. The recorded message may be "garage door closing" or "garage door opening," for example, alerting users of the imminent state change of the movable barrier 108. These warnings notify anyone in the area proximate the movable barrier 108 of the imminent movement of the movable barrier 108, allowing the individual to move away from the path of the movable barrier 108.

A prewarning may be provided when the movable barrier operator 102 receives a state change request that is determined to be an "unattended" state change request. A state change request may be determined to be an attended state change request when the location of the user device requesting the state change is determined to be within a predetermined proximity to the movable barrier 108 (e.g., a state change request from a wall control of the garage 106). A state change request may be determined to be an unattended state change request when the location of the user device requesting the state change is not in proximity to the movable barrier 108 and/or when the location of the user device requesting the state change is not able to be determined to be within a predetermined proximity to the movable barrier 108 (e.g., the location is not known). For instance, the state change request may include identifying data pertaining to the user device requesting the state change from which a state change request may be determined to be attended or unattended. The identifying data may include a user device ID, user device location data, and/or whether the state change request is received at the remote computer 116 via network 114. The movable barrier operator 102 and/or the remote computer 116 may be configured to make the determination of whether to provide a prewarning based on the identifying data. In some embodiments, the movable barrier operator 102 may receive the state change request along with a prewarning request from the remote computer 116 to provide a prewarning.

An unattended state change request may include state change requests received via the network 114, for example, from in-vehicle device 104 or the user device 140. For example, the system 100 may include a geofence such that when a vehicle 110 associated with the movable barrier operator 102 moves more than a certain distance away from the movable barrier operator 102 (e.g., 500 feet), the vehicle 110 automatically sends a state change request to the movable barrier operator 102 to cause the movable barrier operator 102 to move the movable barrier 108 to a closed state if the movable barrier 108 is currently in an open state. A geofence may be a virtual boundary defining an area that is within the geofence or the geofenced area. The geofenced area may be positioned about a movable barrier operator 102 so that when the in-vehicle device 104 crosses the boundary of the geofence, a state change request is automatically sent to the movable barrier operator 102 to open or close the movable barrier 108. The geofence may be set to be any shape area about the movable barrier operator 102, for example, a set distance (e.g., a radius) from the movable barrier operator 102, a rectangular area about the movable barrier operator 102, or be based upon the streets about the user's movable barrier operator 104 (e.g., a set distance at a point along each street leading to or from the user's home). In some forms, the geofenced area is set by the estimated time (e.g., 1 min) it will take for the user to travel to the movable barrier operator 102 based on the user's current location, the movable barrier operator 102, traffic conditions, etc. When the location of the in-vehicle device 104 is not known or is determined to not be in proximity to the movable barrier 108, a prewarning may be provided before moving the movable barrier 108 to the closed state. The notification apparatus 124 may be activated to alert those in the area regarding the imminent state change of the movable barrier 108.

In some forms, the movable barrier operator 102 itself may not include communication circuitry or a communication interface that is configured to communicate via a network. This may include older movable barrier operators that are not configured to communicate via the network 114. These movable barrier operators may be associated with a communication hub 142 (FIG. 1) such as a movable barrier operator enhancement device that is connected to the network 114 and configured to provide network connected capabilities to movable barrier operators without such capabilities, for example, as a retrofit improvement to the movable barrier operator. As an example, the communication hub 142 may be similar to the communication hubs disclosed in U.S. Pat. No. 10,597,928. For instance, the communication hub 142 may include communication circuitry and may be configured to communicate with the remote computer 116 via the network 114. Upon receiving a state change request via the network 114, the communication hub 142 may use an RF transmitter to send a state change command to the movable barrier operator. The movable barrier operator recognizes the transmitter of the communication hub 142 and changes the state of the movable barrier operator in response to receiving the state change command from the communication hub 142. The communication hub 142 may be in communication with sensor (e.g., a tilt sensor, accelerometer, gyroscope, etc.) that is configured to detect one or more parameters of the movable barrier 106 such as orientation, position, and/or direction of movement. The communication hub 142 may provide the remote computer 116 with the current state of the movable barrier 108 based on the communication with the sensor. The communication hub 142 may further determine or infer the direction of movement of the movable barrier 108 during a state change operation and cause the movable barrier operator to stop and reverse the operation upon receiving a cancel command via the network 114. Thus, the communication hub 142 enables the state of the movable barrier 108 to be changed and monitored via the network. As used herein, movable barrier operator 102 encompasses a movable barrier operator and a communication hub 142 that provides network communication capabilities to the movable barrier operator.

Figure 3:
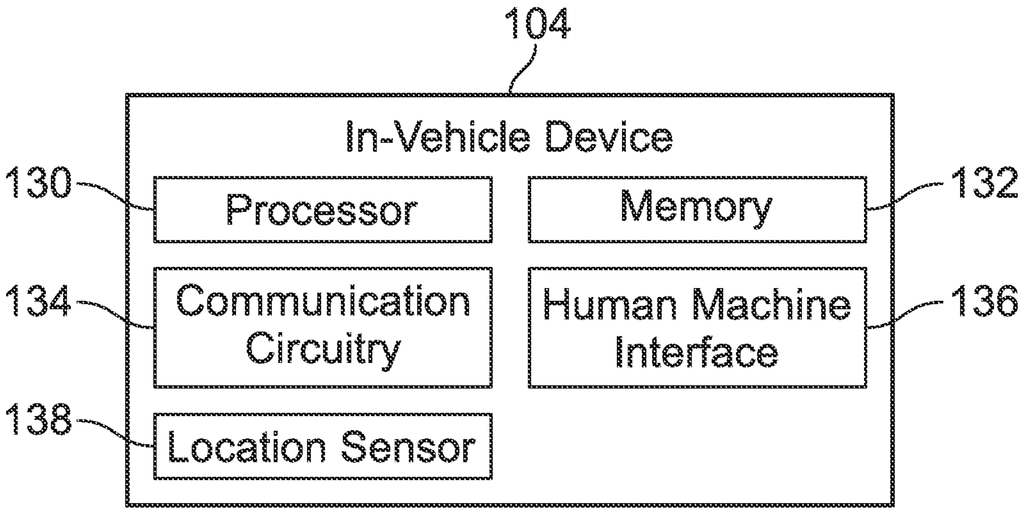
FIG. 3 is a block diagram of the in-vehicle device of FIG. 1.

With respect to FIG. 3, the in-vehicle device 104 includes a processor 130, a memory 132, communication circuitry 134, a user interface such as a human machine interface 136, and a location sensor 138. The processor 130 is communicatively coupled the memory 132, the communication circuitry 134, the human machine interface 136, and the location sensor 138. The processor 130 carries out the functionality of the in-vehicle device 104. The memory 132 stores programs and executable instructions for the processor 130 to execute to carry out various functions of the in-vehicle device 104. The processor 130 sends and receives communication signals via the communication circuitry 134.

The processor 130 may communicate state change commands to the movable barrier operator 102 that are associated with the in-vehicle device 104 via the communication circuitry 134. The movable barrier operator 102 and the in-vehicle device 104 may be associated with one another, for example, by their association with a user account. The movable barrier operator 102 may also communicate the current state of the movable barrier 108 to the in-vehicle device 104. The processor 130 receives this communication and may store the current state of the movable barrier 108 in the memory 132.

The processor 130 may also be configured to display to the user via the human machine interface 136 when the movable barrier 108 changes states and/or the current state of the movable barrier 108. For example, if the user has driven the vehicle 110 from their home and would like to check the status of the movable barrier 108, the user may operate the human machine interface 136 to check whether the movable barrier 108 is open or closed. In some forms, when the user selects to view the status of the movable barrier 108, the processor 130 requests the current state of the movable barrier 108 from the movable barrier operator 102 via the network 114. The processor 130 may then display the current state of the movable barrier 108 to the user via the human machine interface 136. The user may also use the human machine interface 136 to cause the in-vehicle device 104 to communicate a state change command to the movable barrier operator 102. The processor 130 may receive a user input via the human machine interface 136 which causes the processor 130 to send a state change command the movable barrier operator 102. The processor 130 may communicate the state change command to the movable barrier operator 102 via the communication circuitry 134.

The communication circuitry 134 may include one or more transceivers configured to communicate with remote devices, including the movable barrier operator 102. The communication circuitry 134 may communicate directly with movable barrier operator 102 via radio frequency signals (e.g., radio frequency signals in the 300 MHz to 900 MHz range). The communication circuitry 134 may further communicate directly with the movable barrier operator 102 via one or more protocols including Bluetooth, Bluetooth Low Energy (BLE), Near Field Communication (NFC), Z-wave, and ZigBee. The communication circuitry 114 may be configured to communicate with the movable barrier operator 102 indirectly via the network 114 and the remote computer 116 associated with the movable barrier operator 102. For example, the communication circuitry 134 may be configured to communicate via cellular and/or Wi-Fi approaches.

The human machine interface 136 may include a display (e.g., a touch screen display), a microphone, speaker, and/or a keyboard. The processor 130 may display a graphical user interface on the human machine interface 136 for displaying information to the user. The user may input information or selections via the human machine interface 136 to navigate through various screens, features, and information of the in-vehicle device 104. The user may use the human machine interface 136 to retrieve information pertaining to the state of each movable barrier operator 102 associated with their user account and/or the in-vehicle device 104. The user may also use the human machine interface 136 to communicate state change request control signals to the movable barrier operator 102 to cause the movable barrier operator 102 to change the state of the movable barrier 108. The user may use the touch screen display to input information and send commands via the in-vehicle device 104. Alternatively, or additionally, the human machine interface 136 may present information to the user via the speaker and receive commands via a user's spoken commands received via the microphone.

As mentioned above, the in-vehicle device 104 may be configured to notify the user via the human machine interface 136 when the movable barrier operator 102 has received a request to change states. The in-vehicle device 104 may notify the user that the movable barrier operator 102 is about to be closing or opening the movable barrier 102 and present the user with the option to cancel the state change. In one form, the in-vehicle device 104 presents the impending or current state change operation on the display of the human machine interface 136. The in-vehicle device 104 may display text indicating which movable barrier operator 102, which direction the movable barrier 108 is moving to (e.g., the closed or open states), and/or a graphic illustrating the state change operation.

The in-vehicle device 104 may further present the user with the option to cancel the state change operation. The in-vehicle device 104 may display a selectable virtual button on the touch screen display for the user to press to cancel the state change operation if desired. The in-vehicle device 104 may use the speaker to audibly notify the user of the state change operation. The in-vehicle device 104 may further prompt the user to say, utter or otherwise verbalize a command to cancel the state change operation if desired, for example, the in-vehicle device may play a message such as "If you would like to cancel this operation, please say 'Cancel.'" The in-vehicle device 104 may use the microphone to listen for a user-spoken command to cancel the operation. If the user cancels the operation, the in-vehicle device 104 may communicate a signal to cancel the operation to the movable barrier operator 102. The in-vehicle device 104 may be configured to wait a period of time to receive input from the user cancelling the operation. After a period of time, the option to cancel the operation may expire or time out. The in-vehicle device 104 may then cease displaying the notification of the state change operation and may, for example, display the graphical user interface that was displayed prior to notifying the user of the state change operation.

The in-vehicle device 104 further includes a location sensor 138. The location sensor 138 may include, for example, Global Navigation Satellite System (GNSS) circuitry. The GNSS circuitry that receives signals from satellites of a GNSS and calculates the location of the vehicle 110. The location sensor 138 may include circuitry (e.g., communication circuitry 134 and processor 130) configured to determine the in-vehicle device 104 location based on signals received from cell towers and/or Wi-Fi networks. As another example, the location sensor 138 may be configured to detect a beacon signal transmitted from a location in proximity to the movable barrier 108. For instance, an ultrasonic or electrical signal may be transmitted from the location near the movable barrier 108. The location sensor 138 may be configured to determine the approximate location of the in-vehicle device 104 based upon the detection of the beacon signal. For example, the in-vehicle device 104 may be able to determine that the in-vehicle device 104 is within a geofenced area about the movable barrier 108.

The processor 130 may use the location of the vehicle to determine whether to send state change request signals directly to the movable barrier operator 102 or via the network 114. For example, if the user requests a state change, but the vehicle is a mile from the movable barrier

108, the in-vehicle device 104 may determine to communicate the state change request via the network 114. The in-vehicle device 104 may be configured to automatically send state change commands upon entering or exiting a geofenced area. For example, a user may set a geofence with a 1000 feet radius about the movable barrier 108. When the in-vehicle device 104 determines that in-vehicle device 104 has entered the geofenced area, the in-vehicle device 104 may communicate a state change command to the movable barrier operator 102 to open the movable barrier 108. When the in-vehicle device 104 determines that the in-vehicle device 104 has exited the geofenced area, the in-vehicle device 104 may communicate a state change command to the movable barrier operator 102 to close the movable barrier 108 if the movable barrier 108 is still open.

Figure 4A:
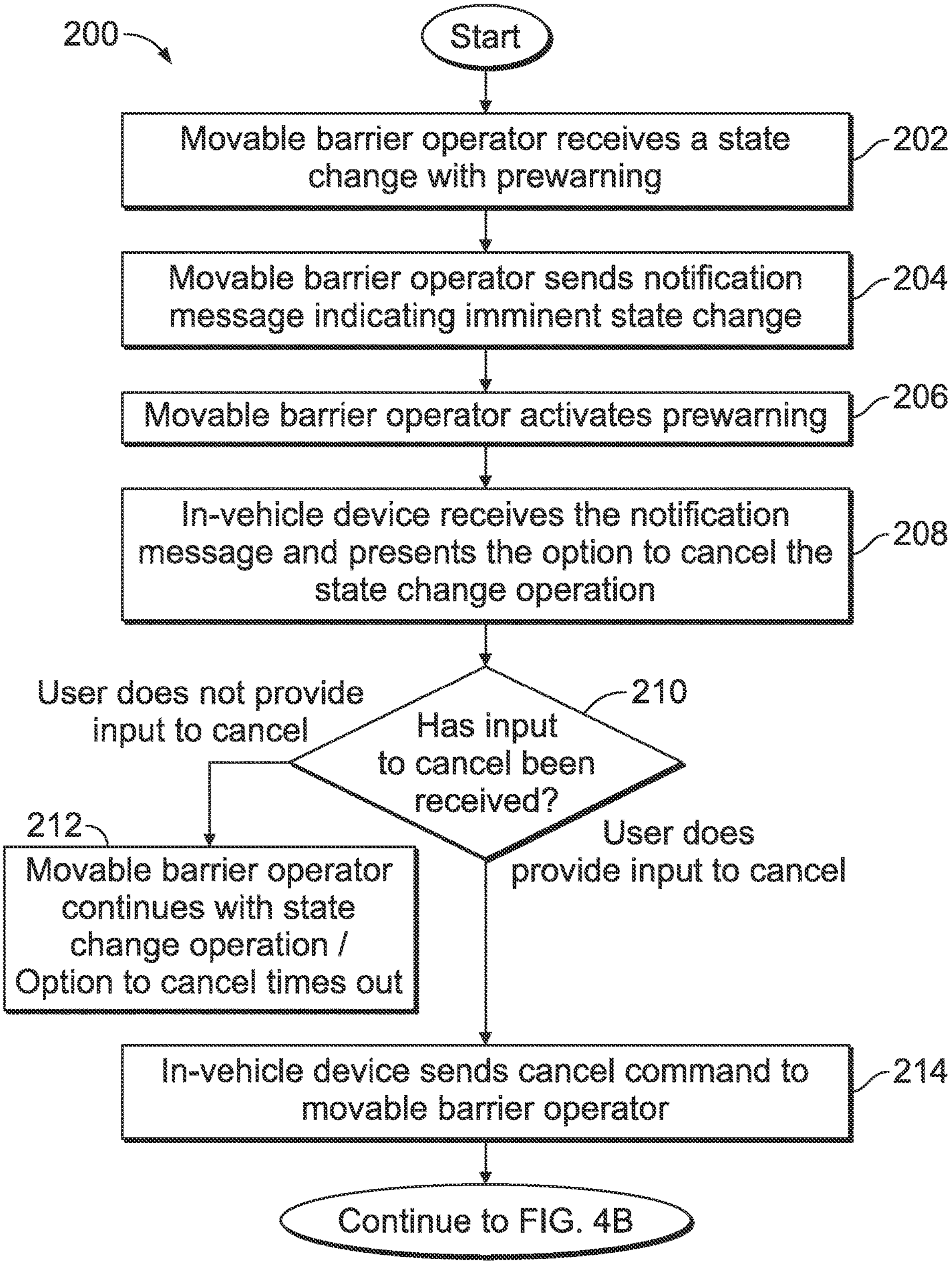
FIGS. 4A-B are a flow diagram for controlling the operation of the movable barrier operator using the in-vehicle device of FIG. 1 according to a first embodiment.
Figure 4B:
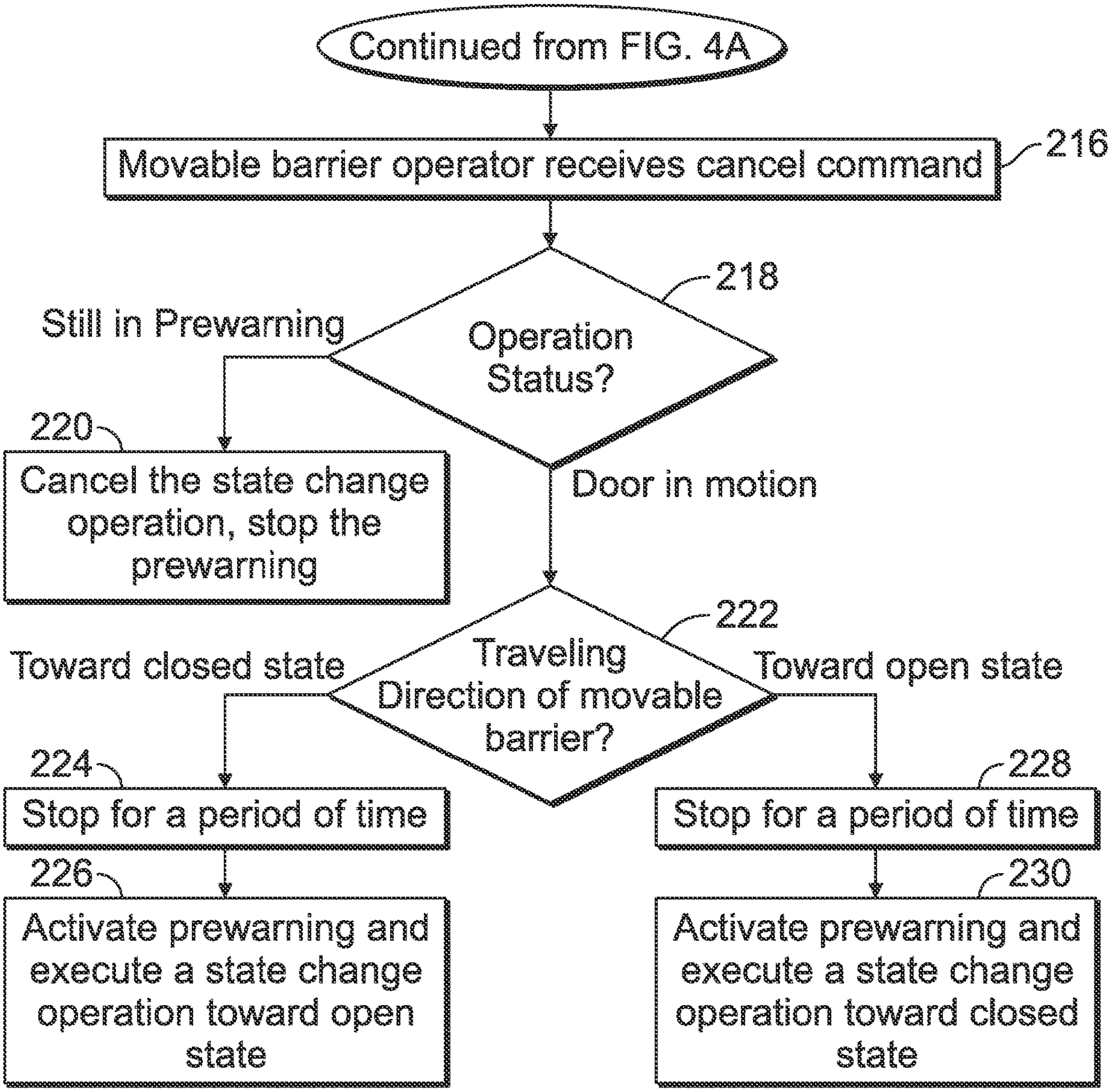

With respect to FIGS. 4A-B, a method 200 is shown for cancelling a state change operation of the movable barrier operator 102. The movable barrier operator 102 receives 202 a state change command with a prewarning or, alternatively, receives a state change command and determines that the command should be carried out by actuating the notification apparatus 124 to provide the prewarning relative to closing or opening of a movable barrier associated with the movable barrier operator 102. Before moving the movable barrier 108, the movable barrier operator 102 activates the notification apparatus 124 to notify anyone proximal the movable barrier 108 of the imminent movement of the movable barrier 108. As mentioned above, commands from state change requests determined to be unattended state change requests may be executed along with a prewarning. The prewarning may be determined to be provided by the movable barrier operator 102 and/or the remote computer 116 based on a determination that the state change request is an unattended request. A state change request may be determined to be an unattended request when the state change request is received over the network 114 from user devices such as smartphones, tablet computers, and the in-vehicle device 104. In some embodiments, a prewarning request may be provided along with the state change request to the movable barrier operator 102. Providing a prewarning via the notification apparatus 124 ensures that people proximate the movable barrier 108 are aware that the movable barrier 108 will be moving, since the person requesting the state change request may be remote from the movable barrier 108.

The movable barrier operator 102 sends 204 a notification message indicating that the movable barrier operator 102 is or is about to carry out a state change operation and activates 206 the notification apparatus 124. The notification message of operation 204 may be sent via short message service (SMS) via the communication circuitry 120 and/or via the network 114 to the remote computer 116 and/or the in-vehicle apparatus 104. The remote computer 116 may be configured to notify devices of a user account associated with the movable barrier operator 102 that the movable barrier operator 102 is executing a state change command.

The communication circuitry 134 of the in-vehicle device 104 receives 208 the notification message sent via SMS and/or via the network 114 at operation 204. If the vehicle 110 is on or in use, the in-vehicle device 104 may present the state change operation notification to the user via the human machine interface 136. In some forms, the in-vehicle device 104 displays text and/or a graphic on the display indicating the state change operation of the movable barrier operator 102. The in-vehicle device 104 may further display a prompt or an option to cancel the state change operation. In some forms, the in-vehicle device 104 may display a virtual button the user may touch to cancel the operation. In some forms, the in-vehicle device 104 may include an option to cancel the operation selectable via physical buttons or a keyboard of the human machine interface 136, for example, a button on the steering wheel of the vehicle 110. In some forms, the in-vehicle device 104 may use the speaker of the human machine interface 136 to notify the user of the state change operation and present the user with the option to cancel the operation. The user may cancel the operation by speaking a command detected by the microphone of the human machine interface 136 or by selecting an option on the display. In some embodiments, the option to cancel the state change operation is only presented to the user if the state change request is determined to be an unattended state change request.

The in-vehicle device 104 then determines 210 whether the user provides a user input selecting to cancel the state change operation of the movable barrier operator 102. If the user does not provide a user input to the human machine interface 136 to cancel the state change operation, the movable barrier operator 102 continues to execute 212 the state change operation. After a period of time, the option to cancel the operation times out (e.g., after 10 seconds) and the in-vehicle device 104 may cause the display of the human machine interface 136 to no longer present the graphical user interface indicating the state change operation and the option to cancel the operation.

If the user does provide input opting to cancel the state change operation, the in-vehicle device 104 sends 214 a cancel message to the movable barrier operator 102. The in-vehicle device 104 may use the communication circuitry 134 to send a cancel command via the network 114 to the remote computer 116. The remote computer 116 may communicate the cancel command to the movable barrier operator 102 via the network 114. In embodiments wherein the in-vehicle device 104 displays a screen or message indicating the state change operation and the option to cancel on the display of the human machine interface 136, upon receiving input to cancel the operation, the in-vehicle device 104 may cause the screen or message to disappear or to no longer be presented.

The movable barrier operator 102 receives 216, via the network 114, the cancel command originating from the in-vehicle device 104. Upon receiving the cancel command, the movable barrier operator 102 determines 218 the current status of the state change operation. When the movable barrier operator 102 determines that the movable barrier operator 102 is still providing the prewarning, the movable barrier operator 102 may cancel 220 the operation and cease providing the prewarning.

Where the movable barrier operator 102 determines that the movable barrier operator 102 is carrying out the state change operation such that the movable barrier 108 is in motion, the movable barrier operator 102 may then determine 222 the traveling direction of the movable barrier 108. For example, the movable barrier operator 102 may determine whether the movable barrier 108 is being moved to the closed state or to the open state. Upon determining the movable barrier 108 is moving toward the closed state, the movable barrier operator 102 may stop 224 the motor 122 and thus the movable barrier 108 for a period of time (e.g., ½ seconds). The movable barrier operator 102 may also activate 226 a prewarning and move the movable barrier 108 in the opposite direction back toward the open state. Similarly, upon determining the movable barrier operator 102 is moving toward the open state, the movable barrier operator 102 may stop 228 the motor 122 and thus the movable barrier 108 for a period of time (e.g., ½ seconds). The movable barrier operator 102 may also provide 230 a prewarning and move the movable barrier 108 in the opposite direction or back toward the closed state. In embodiments wherein the movable barrier 108 is an overhead garage door, the closed state may be when the movable barrier 108 if fully down and the barrier 108 closes an opening of the garage 106 and the open state may be where the movable barrier 108 is up permitting ingress and egress through the opening of the garage 106.

Figure 5A:
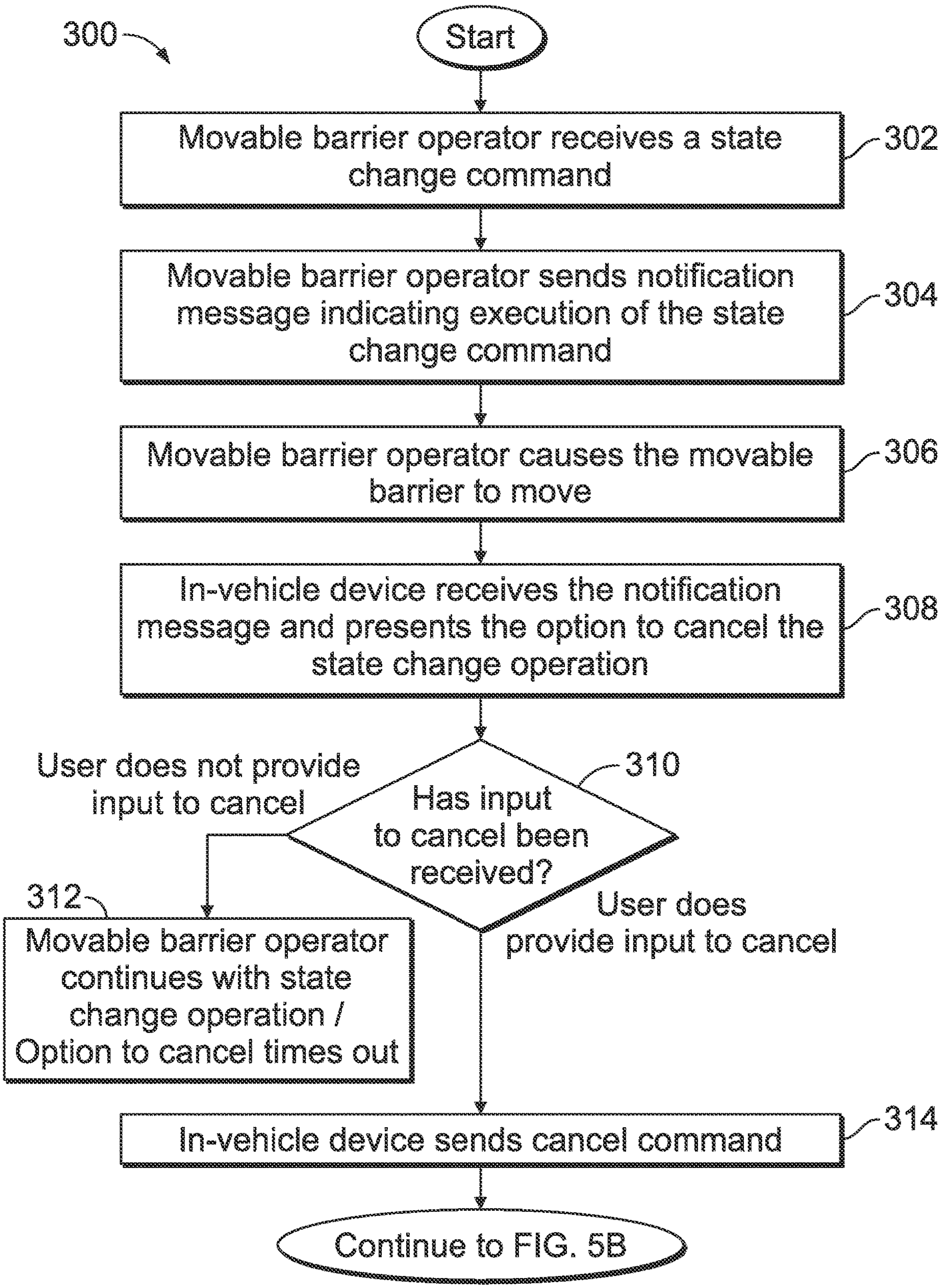
FIGS. 5A-B are a flow diagram for controlling the operation of the movable barrier operator using the in-vehicle device of FIG. 1 according to a second embodiment.
Figure 5B:
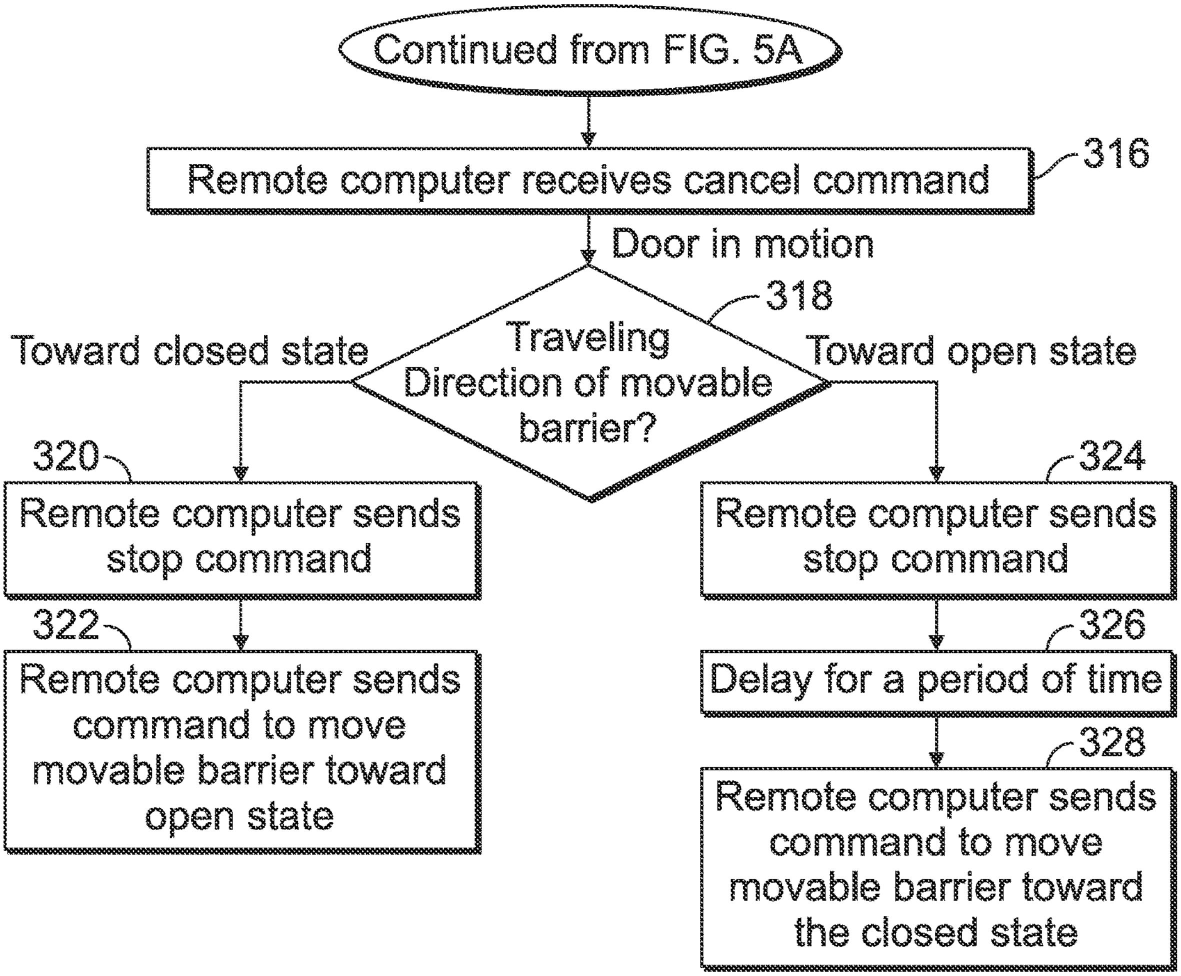

With respect to FIGS. 5A-B, method 300 is shown for canceling a state change operation of the movable barrier operator 102 according to another approach. Method 300 is similar in many respects to method 200, with the differences being highlighted in the following description. This method 300 may be used with movable barrier operator systems, such as garage door operator systems, that may not be updateable. In method 300, the steps and logic for determining when to carry out various operations and to send messages or notifications may be performed at a network-based resource such as a middleware layer, cloud computing system/device or by remote server 116, with commands being sent to the movable barrier operator 102 via the network 114. The movable barrier operator 102 receives 302 a state change command from a user to change the state of the movable barrier 108. The state change command may be received locally, for example, from a wall control button, a handheld RF transmitter, a keypad or via the network 114 from a user device such as a smartphone or in-vehicle device 104. The state change commands received via the network 114 may be identified as unattended commands and/or be sent along with a request for the movable barrier operator 102 to provide a prewarning. Upon receiving a prewarning request or identifying a state change command to be an unattended command, the movable barrier operator 102 may provide a prewarning via the notification apparatus 124 before moving the movable barrier 108 as described above.

The movable barrier operator 102 may send 304 a notification message indicating that the movable barrier operator 102 is executing a state change command. The movable barrier operator 102 communicates the notification message via SMS and/or via the network 114 as described with regard to method 200. The movable barrier operator 102 then operates 306 the motor 122 to move the movable barrier 108 change the state of the movable barrier 108. The in-vehicle device 104 receives 308 the notification message indicating the movable barrier operator 102 is changing the state of the movable barrier 108. Upon receipt of the notification message, the in-vehicle device 104 may present a notification of the state change operation to the user via the human machine interface 136 along with a prompt or an option to cancel the state change operation to the user as described with regard to method 200.

The in-vehicle device 104 determines 310 whether the user provides input selecting to cancel the state change operation of the movable barrier operator 102. If the user does not provide input to the human machine interface 136 to cancel the state change operation, the movable barrier operator 102 continues to execute 312 the state change operation. After a period of time, the option to cancel the operation times out (e.g., after 10 seconds). The in-vehicle device 104 may cause the display of the human machine interface 136 to no longer present the graphical user interface indicating the state change operation and the option to cancel the operation.

If the user does provide input opting to cancel the state change operation, the in-vehicle device 104 sends 314 a cancel command to the remote computer 116. The in-vehicle device 104 may use the communication circuitry 134 to send the cancel command via the network 114 to the remote computer 116. Where the in-vehicle device 104 displays a screen or message indicating the state change operation and the option to cancel on the display of the human machine interface 136, upon receiving a user input to cancel the operation, the in-vehicle device 104 may cause the screen or message to disappear or to no longer be presented.

The remote computer 116 receives 316 the cancel command from the in-vehicle device 104 via the network 114. The remote computer 116 determines 318 the direction of travel of the movable barrier 108. For example, the remote computer 116 determines whether the movable barrier 108 is traveling toward the closed state or the open state. Where the remote computer 116 determines the movable barrier 108 is moving from the open state toward the closed state, the remote computer 116 sends 320 a stop command to the movable barrier operator 102 via the network 114 to cause the movable barrier operator 102 to stop the motor 122 and stop moving the movable barrier 108. The remote computer 116 sends 322 a command to cause the movable barrier operator 102 to move the movable barrier 108 in the opposite direction or to return toward the open state. In some embodiments, the remote computer 116 provides a command to the movable barrier operator 102 that causes the movable barrier operator 102 to provide a prewarning before moving the movable barrier 108 via the notification apparatus 124. The movable barrier operator 102 may delay operation or remain stopped for a period of time (e.g., one second) after stopping the motor 122 before executing the command to return the movable barrier 108 to the open state.

Similarly, where the remote computer 116 determines the movable barrier 108 is moving from the closed state toward the open state, the remote computer 116 sends 324 a stop command to the movable barrier operator 102 via the network 114 to cause the movable barrier operator 102 to stop the motor 122 and stop moving the movable barrier 108. The movable barrier operator 102 delays 326 operation or remains stopped for a period of time (e.g., one second). The remote computer 116 further sends 328 a command to cause the movable barrier operator 102 to move the movable barrier 108 in the opposite direction or to return toward the closed state. In some embodiments, the remote computer 116 provides a command to provide a prewarning before moving the movable barrier 108 via the notification apparatus 124. In some embodiments, the movable barrier operator 102 may determine to provide a prewarning based on identifying data of the user device requesting the cancel command.

In some embodiments, the remote computer 116 receives 316 a cancel command and sends a cancel command to the movable barrier operator 102. The movable barrier operator 102 receives the cancel command from the remote computer 116 and determines the steps required to cancel the state change operation. The movable barrier operator 102 may determine whether the movable barrier operator 102 has begun moving the movable barrier 108. If the movable barrier 108 is not in motion, the movable barrier operator 102 may cancel the state change operation and prevent the state change request from being carried out. If the movable barrier 108 is already in motion, the movable barrier operator 102 may cause the movable barrier 108 to reverse direction to the previous state. For instance, the movable barrier operator 102 may stop, delay, and reverse the direction of the movable barrier 108.

Figure 6A:
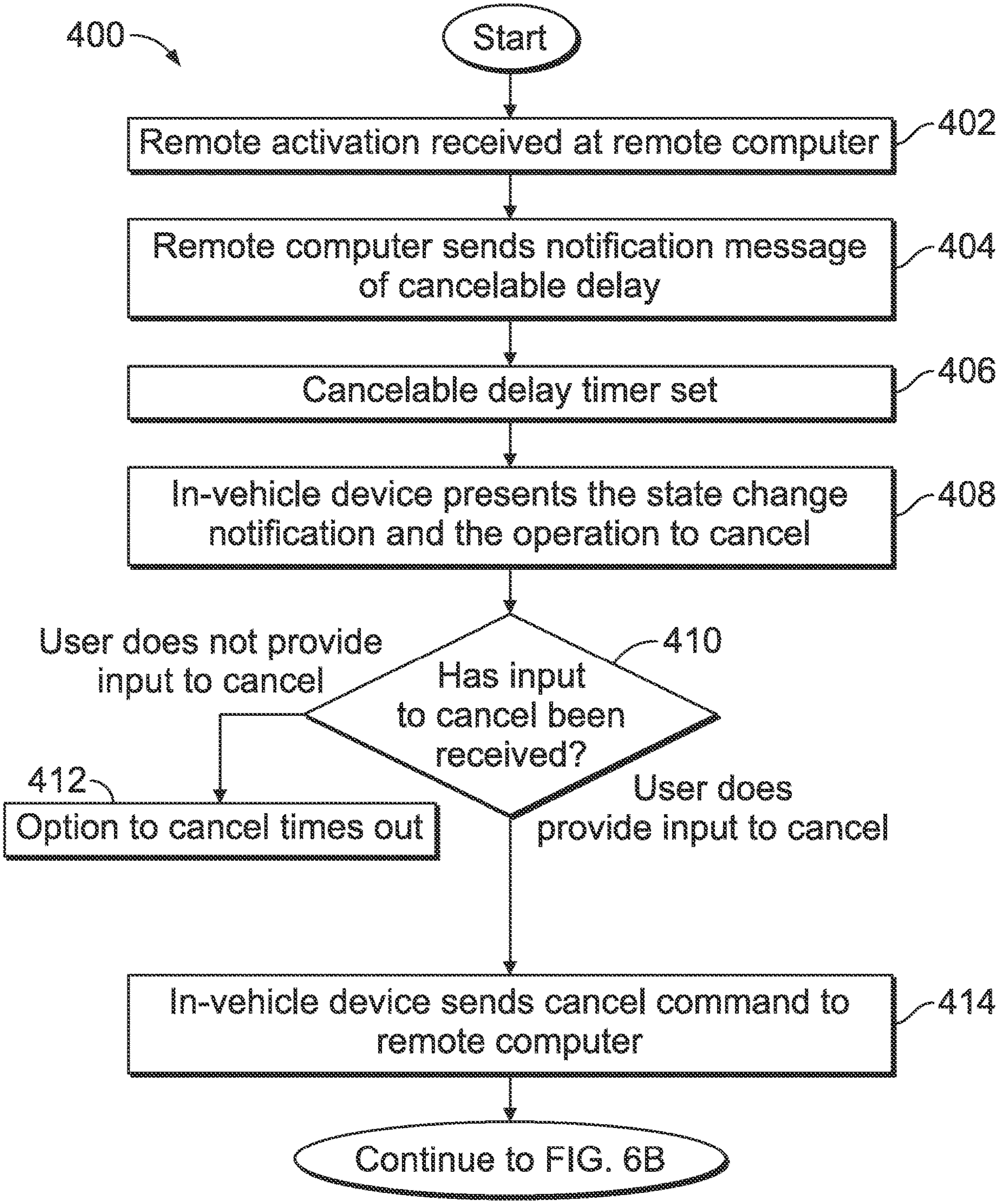
FIGS. 6A-B are a flow diagram for controlling the operation of the movable barrier operator using the in-vehicle device of FIG. 1 according to a third embodiment
Figure 6B:
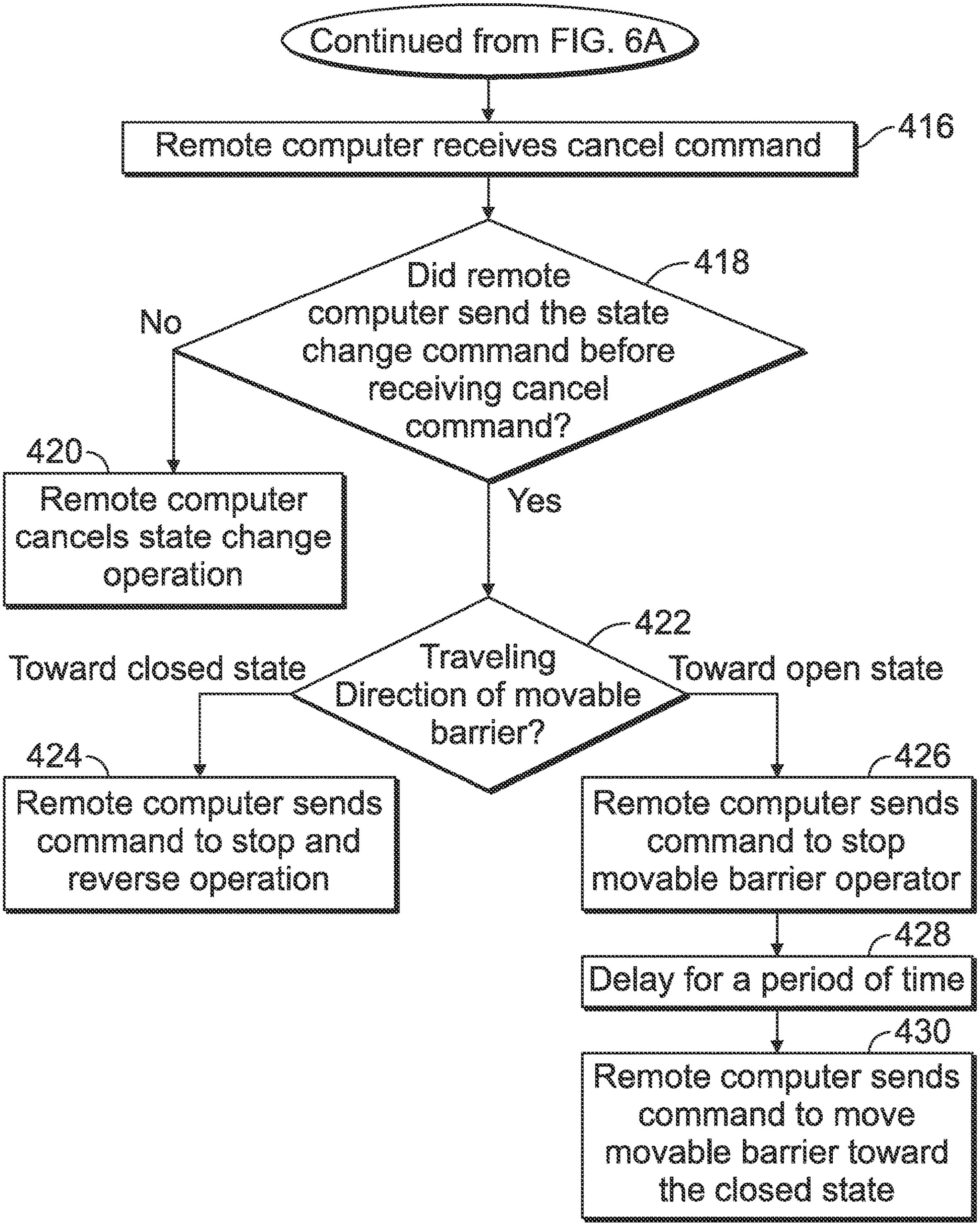

With respect to FIGS. 6A-B, method 400 is shown for canceling the state change operation of the movable barrier operator 102 according to another approach. Method 400 is similar in many respects to methods 200 and 300, with the differences being highlighted in the following description. Method 400 may also be used with movable barrier operator 102 systems that may not be updateable. With method 400, the remote computer 116 receives 402 a request to change the state of the movable barrier 108 via the network 114. The request may be a state change command sent from a user device such as a smartphone, vehicle infotainment system, personal computer and the like. The request may be selected by a user via a smartphone application associated with the remote computer 116 and the movable barrier operator 102. In other forms, the request may be sent automatically, for example, by the in-vehicle device 104 of a vehicle 110 when the vehicle 110 comes into proximity of the movable barrier operator 102. As an example, a user's smartphone may automatically send a state change request upon entering or exiting a geofenced area.

The remote computer 116 sends 404 a notification message to one or more user devices associated with the movable barrier operator 102. The notification message may alert the user that a request to change the state of the movable barrier 108 has been received (e.g., that a state change of the movable barrier 108 is imminent). The notification message may also provide the user with a prompt or the option to cancel the command. The user devices receiving the notification message may include user devices associated with the movable barrier operator 102 in a user account of a smartphone application. For example, a notification message may be sent or broadcast to all user devices associated with the movable barrier operator 102 in the smartphone application. In some forms, the user may select which devices are notified when a state change request is received at the remote computer 116. In some forms, the in-vehicle device 104 that automatically sent the state change request (e.g., upon coming into proximity with the movable barrier operator 102) is sent the notification message to provide the user with the option to cancel the state change request. The notification message may be sent to all in-vehicle devices 104 associated with the movable barrier operator 102.

The user device receiving the notification message of the state change request may be configured to present the option to cancel the state change request to the user for a set period of time, for example 10 seconds. The user device sets 406 a timer for a period of time during which the user is able to cancel the state change request. The user device may start a timer for the set period of time upon receipt of the notification message or upon presenting the notification to the user for example. A user may be permitted to adjust the period of time to cancel the command when presented via the user devices, for example, by changing a setting associated with their user account.

The in-vehicle device 104, and/or other user devices, receives the notification message and presents 408 the user with a notification of the imminent state change operation and the option to cancel the operation. The in-vehicle device 104 may present the notification to the user via a human machine interface 136 as described above.

The in-vehicle device 104 determines 410 if a user input to cancel the state change operation is received within the set period of time. If no input from the user to cancel the state change operation is received within the set period of time, the option to cancel the state change operation times out 412 (i.e. the cancelable delay timer, which was previously set, expires) and the in-vehicle device 104 may cause the display of the human machine interface 136 to no longer present the graphical user interface indicating the state change operation and the option to cancel the operation. The remote computer 116, upon receiving no commands to cancel the state change operation, may send a signal to the movable barrier 102 to carry out the state change operation.

If a user input is received to cancel the state change operation, the in-vehicle device 104 sends 414 a command to cancel the state change operation to the remote computer 116. The in-vehicle device 104, upon receiving the input from the user to cancel the command, may cease to display the notification of the state change operation and the option to cancel via the display.

The remote computer 116 receives 416 the command to cancel the state change operation from the in-vehicle device 104 (or other user device) via the network 114. The remote computer 116 determines 418 whether the command to cancel the state change operation was received before or after the remote computer 116 sent the movable barrier operator 102 a command to change the state of the movable barrier 108. For instance, upon receiving 402 a state change request via the network 114, the remote computer 116 may queue or otherwise delay sending the command to the movable barrier operator 102 for a period of time after sending the notification message to the user devices that a state change request was received to allow time for a user to cancel the state change request if desired. After a period of time (e.g., 10 seconds), if no commands to cancel a state change operation have been received, the remote computer 116 may send a command to the movable barrier operator 102 to carry out the requested state change of the movable barrier 108.

If the remote computer 116 has not yet sent a command to the movable barrier operator 102 to carry out the state change request, the remote computer 116 cancels 420 the state change operation (e.g., by deleting or expunging the command/request from a queue) such that the remote computer 116 does not send a command to the movable barrier operator 102 to change states. If the remote computer 116 has already sent the command to the movable barrier operator 102 to change the state of the movable barrier 108, the remote computer 116 determines 422 the direction the movable barrier 108 is moving to change states, for example, toward the closed state or toward the open state.

Upon a determination that the movable barrier operator 102 is moving the movable barrier 108 toward the closed state, the remote computer 116 sends 424 a command to stop the movable barrier operator 102 and to reverse the operation of the motor 122 to move the movable barrier 102 back toward the open state.

Upon a determination that the movable barrier operator 102 is moving the movable barrier 108 toward the open state, the remote computer 116 sends 426 a command to stop the operation of the movable barrier operator 102. The remote computer 116 may delay 428 for a period of time (e.g., one second) before sending 430 a command to the movable barrier operator 102 to move the movable barrier 108 toward the closed state (e.g., downward for an overhead garage door). The movable barrier operator 102 may be provided with a signal to provide a prewarning via the notification apparatus 124 before moving the movable barrier 108 back to the closed state.

Figure 7:
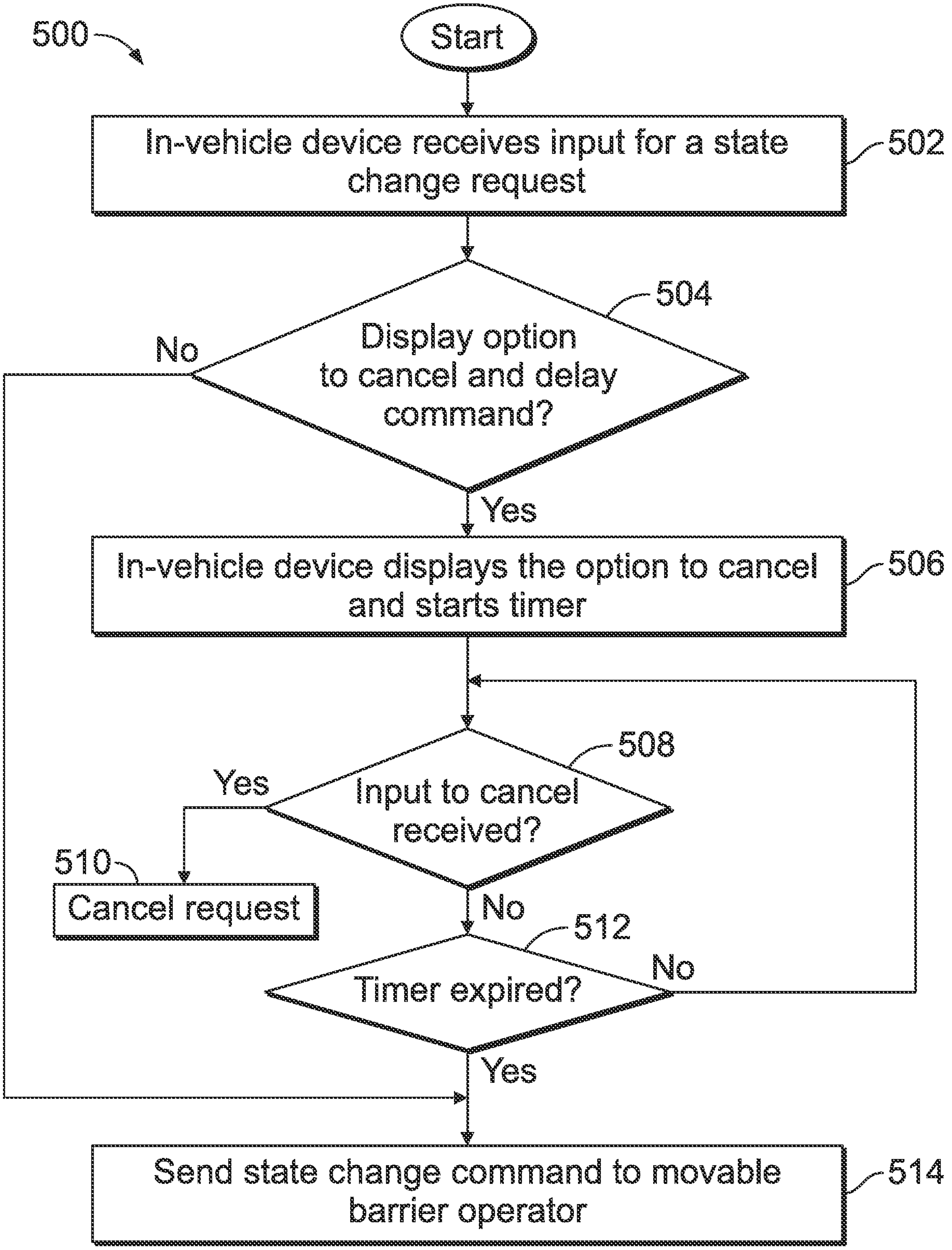
FIG. 7 is a flow diagram for controlling the operation of the movable barrier operator using the in-vehicle device of FIG. 1 according to a fourth embodiment.

With respect to FIG. 7, method 500 is shown for canceling the state change operation of the movable barrier operator 102 according to another approach. Method 500 is an approach where input for a state change request is received 502 or initiated at the vehicle 110 and may be canceled by a user before the in-vehicle device 104 communicates the state change request to the movable barrier operator 102. The input for the state change request may originate from the vehicle 110 or in-vehicle device 104 entering or exiting a geofenced area and/or from the user providing a command via the human machine interface 136 of the in-vehicle device 104 to request a state change operation. The geofence may be a set distance or radius from the movable barrier 108. A user may set the geofence to be a certain distance from the movable barrier 108, for example, 500 to 2000 feet. The location of the vehicle 110 may be determined by the GNSS circuitry 138 of the vehicle 110. The vehicle 110 may determine when the vehicle 110 is within the geofenced area, outside the geofenced area, and when the vehicle 110 enters or exits the geofenced area. For example, when the vehicle 110 enters into a geofenced area and the movable barrier 108 is closed, the in-vehicle device 104 may automatically send a state change command to request the movable barrier 108 be moved to an open position. Similarly, when the vehicle 110 exits the geofenced area and the movable barrier 108 is an open position, the in-vehicle device 104 may automatically send a state change command to request the movable barrier 108 be moved to a closed position. A user may provide an input to request a state change operation by pressing a button (e.g., a physical or virtual button) of the human machine interface 136 of the in-vehicle device 104, such as a button within an application associated with the movable barrier operator 102 or speaking a voice command.

Upon receiving a user input requesting (or otherwise initiating) a state change operation, the in-vehicle device 104 may notify a user (e.g., present via a display of the human machine interface 136) that input has been received for a state change request and/or that a state change operation will be or is being performed. In some instances, the in-vehicle device 104 may also present the user with a prompt or an option to cancel the state change operation. The in-vehicle device 104 determines 504 whether to display an option to cancel the state change operation to the user. The in-vehicle device 104 may determine whether an option to cancel should be displayed to the user by checking the display rules for presenting the option to cancel the requested state change operation to the user. An example table of display rules is provided below.

TABLE 1

Rules for providing option to cancel a requested state change operation

| | Status | |
|---|---|---|
| Input received from: | Inside of Geofence | Outside of Geofence |
| Geofence entry | Delay and Display | X |
| Geofence exit | X | Delay and Display |
| Auto Button Open | Skip Cancel button | Delay and Display |
| Auto Button Close | Skip Cancel Button | Delay and Display |

As shown in Table 1, upon receiving an input requesting a state change operation, the in-vehicle device 104 may determine the location of the in-vehicle device 104. The in-vehicle device 104 may determine whether the vehicle 110 is inside of or outside of the geofence of the movable barrier operator 102. Where the request for a state change operation was automatically generated by the vehicle 110 entering the geofenced area, the in-vehicle device 104 may be configured to delay sending the state change command to the movable barrier operator 102 for a period of time (e.g., ten seconds) and then display the option to cancel the request for the state change operation. Where the request for the state change operation was automatically generated by the vehicle 110 exiting the geofenced area, the in-vehicle device may be configured delay sending the state change command (e.g., for ten seconds) and display the option to cancel the request for the state change operation. Where the user provided the input for the state change operation (e.g., to open or close the movable barrier 108), the in-vehicle device 104 may be configured to delay sending the state change command (e.g., for ten seconds) and display the option to cancel the request for the state change operation when the vehicle 110 is outside of the geofenced area (or more than a predetermined distance from the movable barrier 108 and referred to as "auto button open" or "auto button close" in Table 1). Delaying the sending of the state change command and displaying the option to cancel provides the user with the option to cancel the state change operation in the event that the user inadvertently selected to request a state change operation. The in-vehicle device 104 may be set to not display the option to cancel the request for the state change operation when the user provides an input when the vehicle 110 is within the geofenced area. The in-vehicle device 104 may be configured to not display the option to cancel when the user is within the geofenced area, because it is more likely that the user intended to change the state of the movable barrier 108 when they are within the geofenced area. In other forms, the option to cancel may be delayed and displayed even when the vehicle 110 is within the geofenced area.

Where the in-vehicle device 104 determines the option to cancel should not be presented to the user, the in-vehicle device 104 proceeds to send 514 the state change request to the movable barrier operator 102. The in-vehicle device 104, upon determining that the option to cancel the state change operation should be displayed based on the display rules, displays 506 the option to cancel the state change operation to the user and starts a timer (e.g., a ten second timer). The option to cancel the state change operation may only be available to the user until the timer expires. The timer may be used to determine when to cease delaying sending the cancel command in operation 504. For example, when the option to cancel the command has timed out, the state change command is sent substantially contemporaneously with expiration of the timer or is sent shortly thereafter. The in-vehicle device 104 may display the option to cancel on the display screen that the user may select via a button or touchscreen display of the human machine interface 136. In some forms, the human machine interface 136 provides the user with an audible notification or message of the option to cancel the state change operation.

The in-vehicle device 104 then determines 508 whether a user input is received at the human machine interface 136 selecting the option to cancel the state change operation. For example, the in-vehicle device 104 determines 508 whether the user presses a button selecting the option to cancel or whether the user speaks a voice command to cancel the state change operation. If the in-vehicle device 104 determines that the user has provided an input to cancel the state change operation, the in-vehicle device 104 cancels 510 the state change operation and does not send a signal to the movable barrier operator 102.

If the in-vehicle device 104 determines that input to cancel the state change request has not been received, the in-vehicle device 104 determines 512 whether the timer has expired. If the timer has not expired, the in-vehicle device 104 returns to step 508. If the in-vehicle device 104 determines that the timer has expired and no input has been received to cancel the request, the in-vehicle device 104 sends 514 a state change command to the movable barrier operator 102 to change the state of the movable barrier 108. The in-vehicle device 104 uses the communication circuitry 134 to communicate the state change request via the network 114 to the movable barrier operator 102. Where the movable barrier 108 is in the closed state, the in-vehicle device 104 may send a command to open the movable barrier 108 to the movable barrier operator 102. Where the movable barrier 108 is in the open state, the in-vehicle device 104 may send a command to close the movable barrier 108 to the movable barrier operator 102.

In some forms, when the in-vehicle device 104 displays the option to cancel the state change operation and starts the timer at operation 506, the in-vehicle device sends a pre-warning request to the movable barrier operator 102. The movable barrier operator 102 may then begin providing a prewarning while the option to cancel the state change operation is presented. The timer set in operation 506 may be set for the time the prewarning is provided at the movable barrier operator 102, such that a command to cancel the state change operation must be received before the movable barrier operator 102 has completed the prewarning operation. If the timer has expired and no cancel command has been received, the in-vehicle device 104 may send 514 the state change request to the movable barrier operator 102 and the movable barrier operator 102 may perform the state change operation, having already provide prewarning.

Figure 8A:
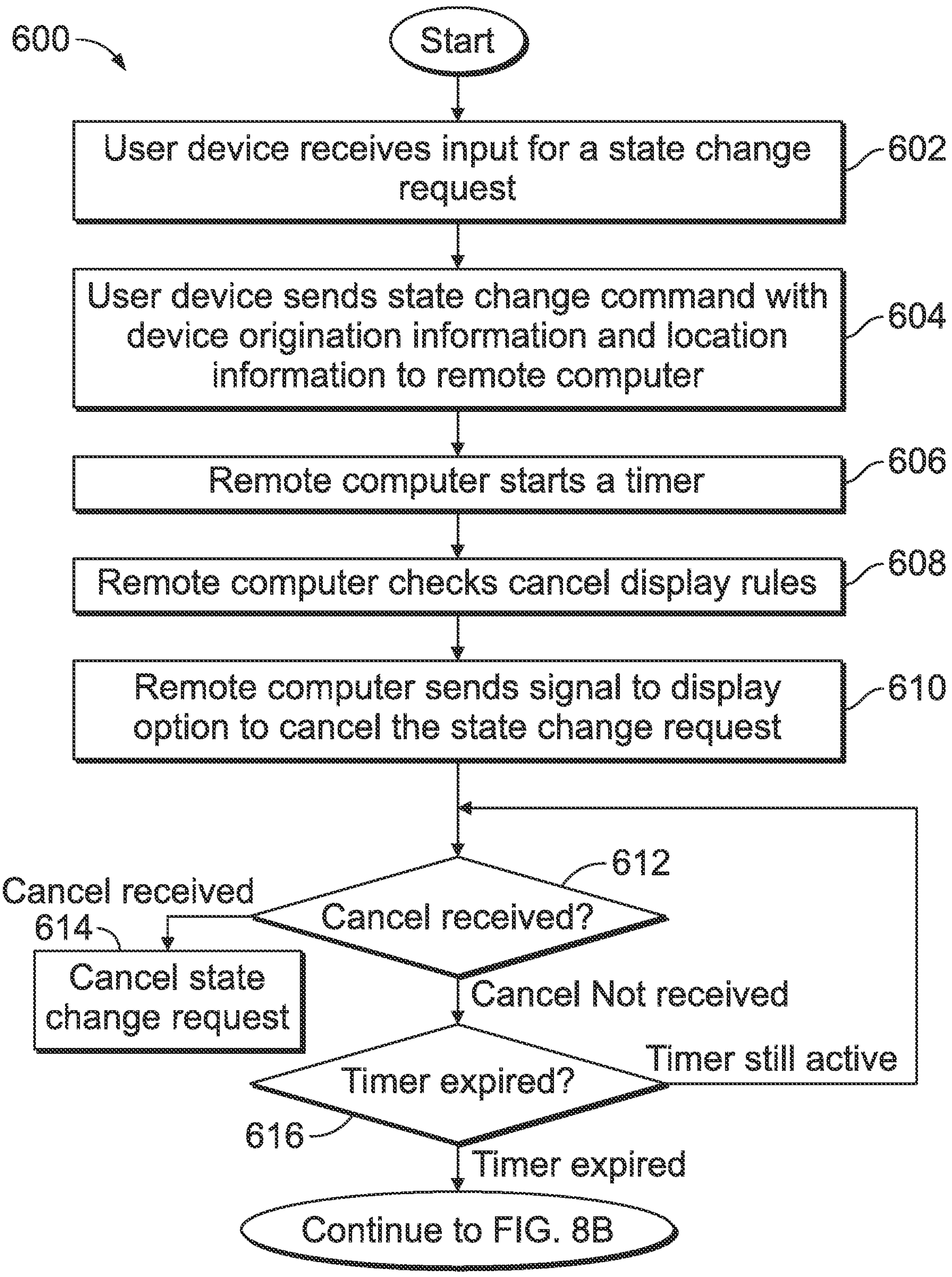
FIGS. 8A-B are a flow diagram for controlling the operation of the movable barrier operator using the in-vehicle device of FIG. 1 according to a fifth embodiment.
Figure 8B:
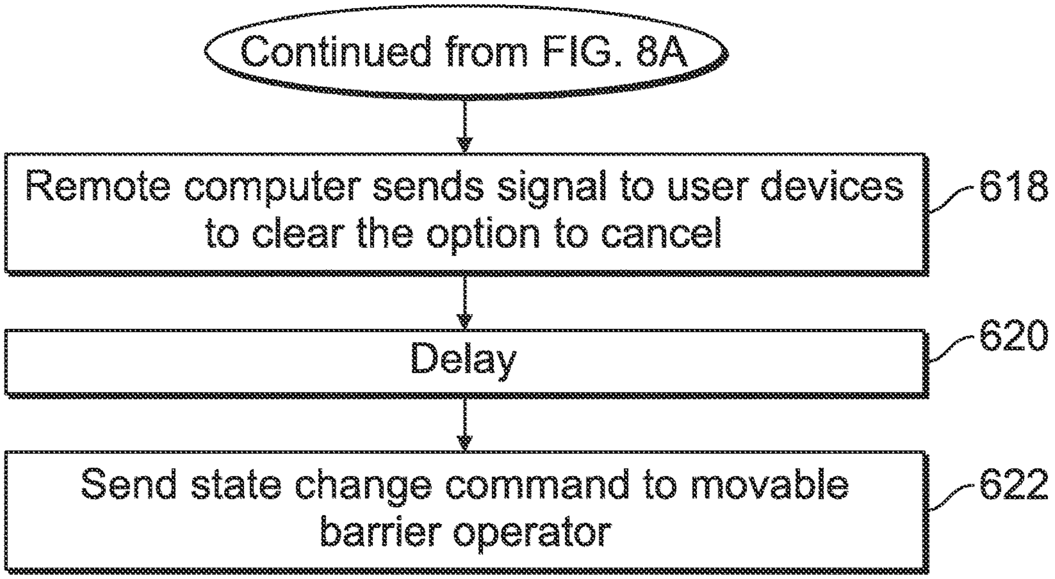

With respect to FIGS. 8A-8B, yet another approach is provided for alerting user devices associated with the movable barrier operator 102 when an unattended command is received and providing the users with the option to cancel the unattended command. In method 600, a user device receives 602 a user input to send a state change command to the movable barrier operator 102 via the network 114. The user device may be in-vehicle device 104 or a smartphone as an example. The in-vehicle device 104 of a vehicle 110 or smartphone of a user may automatically send a state change command upon crossing, e.g., entering or exiting, a boundary defining a geofenced area associated with the movable barrier operator 102. As another example, the in-vehicle device 104 may receive an input from a user via the human machine interface 136 to send a state change command to the movable barrier operator 102, for example, a user may press a button of the human machine interface 136. As yet another example, the user may provide a user input via a user interface of a smartphone to send a state change request to the movable barrier operator 102.

In response to the received input, the user device sends 604 a state change command to the remote computer 116 associated with the movable barrier operator 102 via the network 114. The user device also sends origination information such as whether the state change request is being requested in response to a user input at a smartphone, a user input at a vehicle 110, or the vehicle 110 or smartphone entering or exiting the geofenced area. The user device may also send location information, such as the current location of the user device when sending the state change command or whether the user device is inside or outside of the geofenced area. Where location information is provided to the remote computer 116, the remote computer 116 may determine whether the user device is within a predetermined proximity of a specified location, such as whether the user device is inside or outside of the geofenced area.

The remote computer 116 receives the state change command, device origination information, and location information from the user device. The remote computer 116 may determine the state change command is an unattended command based on the identifying data, such as the device origination information and location information of the user device. The remote computer 116 starts 606 a timer (e.g., 10 seconds) and checks 608 rules regarding display of the cancel option or prompt. The remote computer 116 may determine whether the option to cancel the state change request should be provided to user devices associated with the movable barrier operator 102 and which user devices should receive the option (e.g., which user devices are opted in to receiving the cancelation option). An example table of display rules is provided below.

TABLE 2

Rules for providing option to cancel a requested state change operation

| | Status | |
|---|---|---|
| Input received from | Inside of Geofence | Outside of Geofence |
| Geofence entry (open) | Delay and Display | X |
| Geofence exit (Close) | X | Delay and Display |
| Auto Button Open | Skip Cancel button | Delay and Display |
| Auto Button Close | Skip Cancel Button | Delay and Display |
| Smartphone Button Open | Skip Cancel button | Delay and Display |
| Smartphone Button Close | Skip Cancel Button | Delay and Display |

The rules of Table 2 are similar in many respects to those provided in Table 1 and described in regard to method 500. Table 2 further includes rules for presenting the option to cancel when a smartphone associated with the movable barrier operator 102 is requesting the state change, e.g., via a smartphone application. Where the user device requesting the state change is outside of the geofenced area and the user provided input to request the state change, the user device requesting the state change may delay sending the state change request for a period of time (e.g., ten seconds) and an option to cancel the state change request may be displayed on the user devices associated with the movable barrier operator 102. Where the user device requesting the state change request is inside the geofence and the user provided input to request the state change, the user devices associated with the movable barrier operator 102 may not be provided with the option to cancel the state change request. The user devices may not display the option to cancel when the request is input by a user from within the geofenced area, because it is more likely that the user intended to change the state of the movable barrier 108 when they are within the geofenced area. In other forms, remote computer 116 may be configured to present the option to cancel the state change request at the user devices even when the vehicle 110 is within the geofenced area. The remote computer 116 may be configured to provide the option to cancel a state change request for state change requests originating from the in-vehicle device 104 automatically upon entering or exiting the geofenced area.

In some embodiments, the user may further select which user devices associated with the movable barrier operator 102 are provided with the option to cancel the state change request. For example, where several smartphones are associated with the movable barrier operator 102, the user may select that only one of the smartphones (e.g. a supervisory device or one that is used by a head of household) is provided with the option to cancel the state change request.

Based on the cancel option display rules, the remote computer 116 sends 610 a signal to the user devices that a state change has been requested along with the option to cancel. The remote computer 116 determines 612 if a cancel command has been received from any of the user devices. If the remote computer 116 determines that a cancel command is received from a user device, the remote computer cancels 614 the state change operation and does not send a state change request signal to the movable barrier operator 102.

If the remote computer 116 determines that a command to cancel the state change request has not been received, the in-vehicle device 104 determines 616 whether the timer has expired. If the timer has not expired and is still active, the remote computer 116 returns to step 612. If the remote computer 116 determines that the timer has expired and no input has been received to cancel the request, the remote computer 116 sends 618 a command to the user devices to clear the option to cancel. The remote computer 116 may delay 620 for a period of time to receive an acknowledgement signal from the user devices in response to the command to clear the option to cancel. The remote computer 116 further sends 622 a state change command to the movable barrier operator 102 to change the state of the movable barrier 108. The remote computer 116 communicates the state change request via the network 114 to the movable barrier operator 102. The remote computer 116 may send the state change command along with a prewarning request to cause the movable barrier operator 102 to provide a prewarning.

In yet another approach, when a state change of the movable barrier 108 is requested from a user device (such as a vehicle or smartphone), the in-vehicle device 104 receives a notification of the state change request. The in-vehicle device 104 may present the user with a prompt or the option of whether or not to cancel the state change request via the human machine interface 136. Upon receiving an input from the user to cancel the state change operation, the in-vehicle device 104 may provide a series of commands to the movable barrier operator 102 via the communication circuitry 134 to cause the movable barrier operator 102 to stop the state change operation. The in-vehicle device 104 may receive information from the movable barrier operator 102 and/or the remote computer 116 regarding the direction of travel of the movable barrier 108. The in-vehicle device 104 may be configured to infer the direction of travel of the movable barrier 108 based on a state machine and/or the information indicating the state of the movable barrier 108 before the state change request and upon receiving a notification message that that the movable barrier operator 102 is changing the state of the movable barrier 108.

The in-vehicle device 104 may send one or more commands to the movable barrier operator 102, either locally or via the network 114, to stop the state change operation. The in-vehicle device 104 may send a command to cause the movable barrier operator 102 to stop moving the movable barrier 108. Upon receipt of the command, the movable barrier operator 102 stops the operation of the motor 122. The command from the in-vehicle device 104 may cause the motor to stop operating for a period of time (e.g., one second) before reversing the operation of the motor 122 to return the movable barrier 108 to the previous state. For instance, if the movable barrier 108 is being moved from the open state to the closed state, the movable barrier operator 102 would return the movable barrier 108 to the open state. Alternatively, the in-vehicle device 104 may send another command after a period of time (e.g., 1 second) to cause the movable barrier operator 102 to operate in the reverse direction to return the movable barrier 108 to the previous state. In some forms, the in-vehicle device 104 sends a command causing the movable barrier operator 102 to provide a prewarning via the notification apparatus 124 before operation of the motor 122 to move the movable barrier 108. In some forms, the movable barrier operator 102 provides a prewarning signal based on the identifying data provided from the user device canceling the state change operation.

In the above methods, the option or prompt regarding whether or not to cancel a state change operation may be presented to a user at their user device each time the movable barrier operator 102 is changing the state of the movable barrier 108 along with a prewarning. As mentioned above, a prewarning may be provided before state change operations requested by devices not in proximity to the movable barrier 108 or those the system 100 is not able to determine are near the movable barrier 108, such as those sent via network 114. In some embodiments, the system 100 may further be able to determine whether to provide a prewarning based on RF signals sent from an RF transmitter, such as a handheld remote control or transmitter of the communication circuitry of a vehicle 110 as described in further detail below.

Figure 9A:
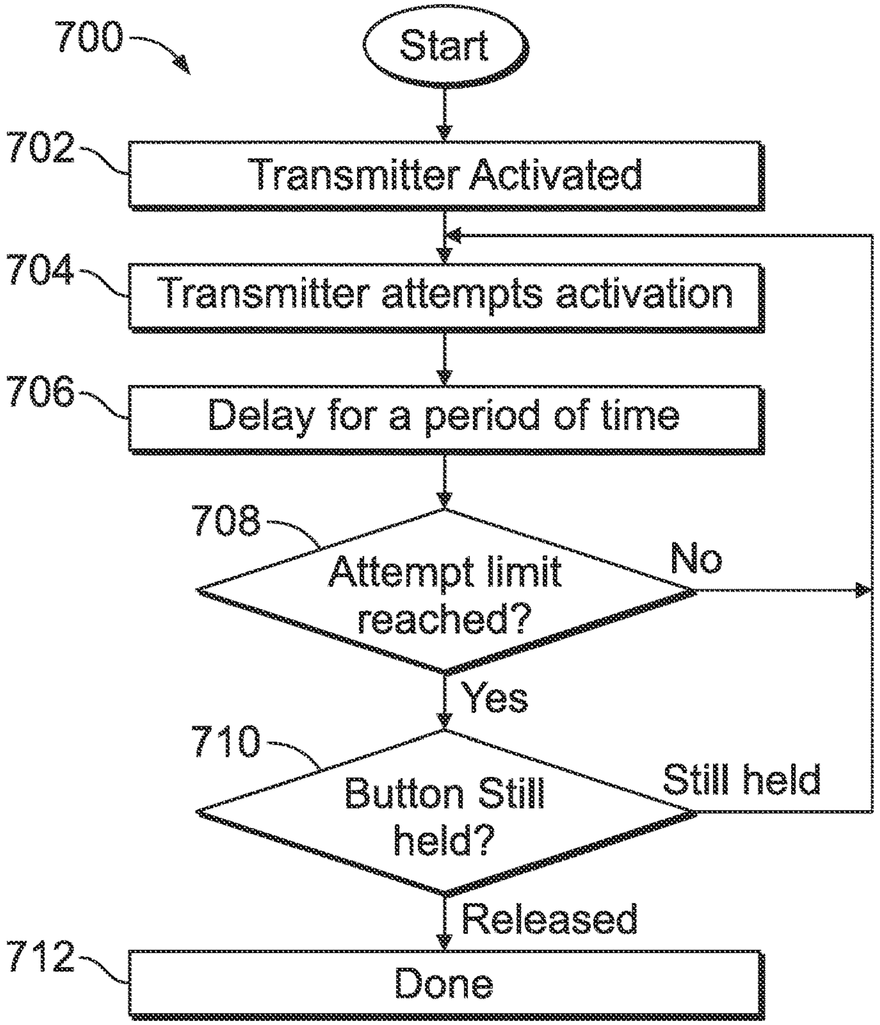
FIG. 9A is a flow diagram of an example method of sending a state change command from a transmitter, the method including the movable barrier operator determining whether to provide a prewarning according to a first embodiment.
Figure 9B:
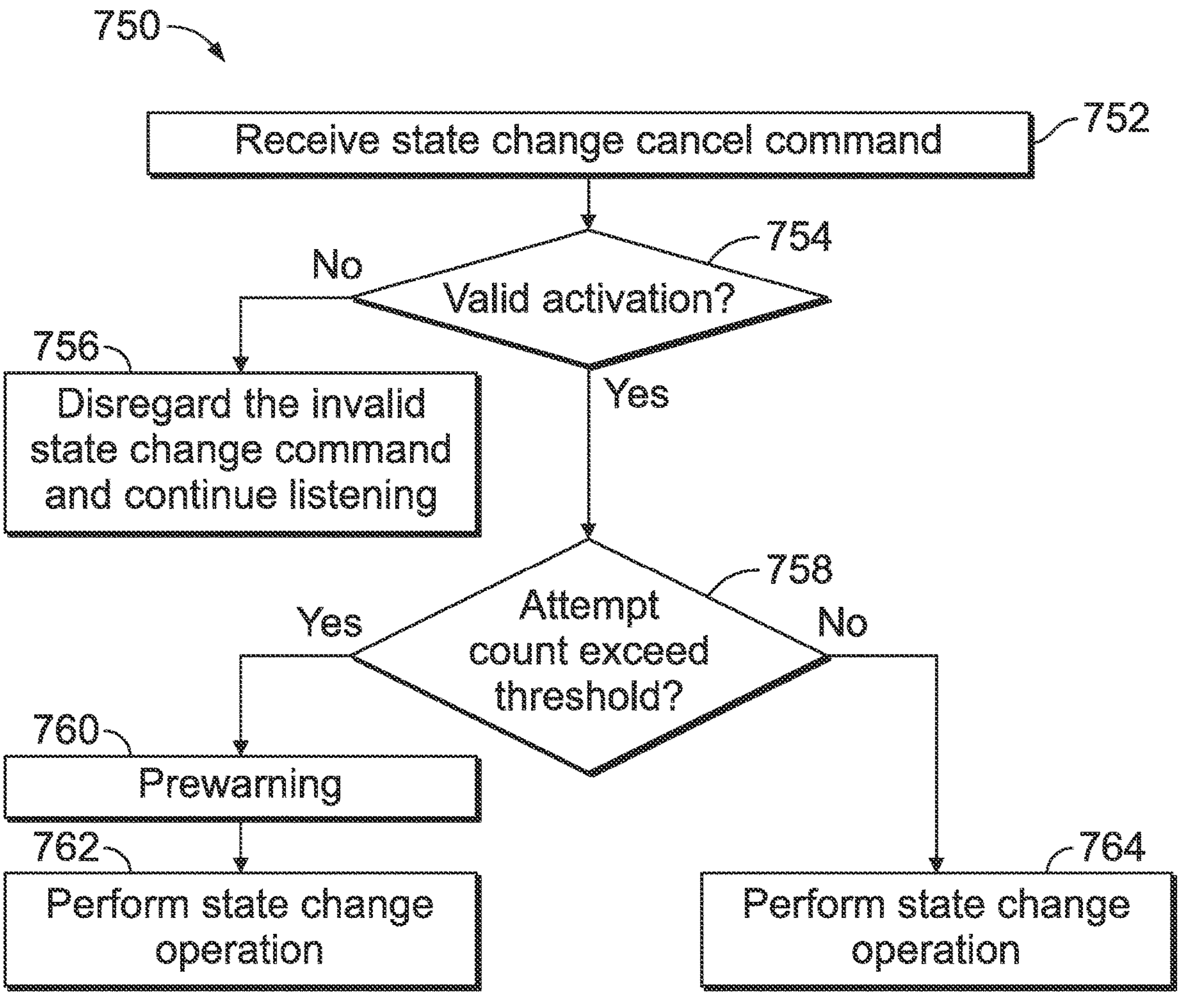
FIG. 9B is a flow diagram of an example method of the movable barrier operator receiving the state change command from the transmitter and determining whether to provide the prewarning at the movable barrier operator according to a first embodiment.

With respect to FIGS. 9A-9B, related methods 700 and 750 are provided for determining whether a prewarning should be provided by the movable barrier operator 102 in response to control signals from an RF transmitter. Method 700 relates to the steps performed at the transmitter, such as an RF transmitter of the communication circuitry 134 of the in-vehicle device 104 or a handheld transmitter, such as a transmitter (commonly known as a “clicker”) configured to be clipped to the visor of a vehicle 110. The transmitter is activated 702 to start the transmitter sequence. The transmitter may be activated by a user pressing a button of the transmitter or otherwise providing input via a user interface of the transmitter. In forms where the transmitter is a transmitter of the in-vehicle device 104, the transmitter may be activated by a user providing a user input to the human machine interface 136, for example, by pressing a virtual button on the display, pressing a physical button which is a configurable/soft button with a label that changes on the display relative to an active mode or functionality instantiated on the display, or speaking a command into a microphone of the human machine interface 136. The transmitter may also be activated in response to a determination that a vehicle 110 and/or the in-vehicle device 104 has entered or exited a geofenced area.

The transmitter sends 704 a state change command via an RF signal to initiate a state change operation at the movable barrier operator 102 along with an activation attempt count. Upon sending the signal, the transmitter may delay 706 sending a subsequent signal for a period of time, for example, 10 milliseconds or 100 milliseconds. The transmitter may be configured to repeat or loop through steps 704 and 706 a predetermined number of times, for example, one to 20 times. Each time the transmitter sends 704 an activation signal, the transmitter increases the activation attempt count indicating the number of activation attempt signals that have been sent. In other forms, the transmitter repeats steps 704 and 706 for a period of time, for example 500 milliseconds. The transmitter may determine 708 whether the number of state change command signals, indicated by the counter, is equal to or has exceeded the predetermined activation attempt limit. Once the activation attempt counter reaches the predetermined number of attempts (e.g., 20) or length of time, the transmitter determines 710 whether the button is still pressed or whether input is still being received from the user to send activation signals. If the button is still being pressed, or such input is still being received, the transmitter returns to repeat steps 704, 706, and 708. If the button is no longer being pressed, or input is no longer being received to send the activation signal, the transmitter may end 712 the process.

With respect to FIG. 9B, the method 750 for activating the state change operation is performed by the movable barrier operator 102. The method 750 may begin by the movable barrier operator 102 receiving 752 a state change command RF signal sent from the transmitter. The movable barrier operator 102 may determine 754 whether the activation signal is a valid activation attempt. For example, the movable barrier operator 102 may determine whether the activation signal includes a fixed code of a learned transmitter and/or an expected rolling/changing code. If the movable barrier operator 102 determines the received state change command is not valid, the movable barrier operator 102 disregards 756 the invalid activation signal and continues listening for further activation signals.

If the movable barrier operator 102 determines the received state change command is valid, the movable barrier operator 102 determines 758 whether the number of state change commands the transmitter has sent to activate the movable barrier operator 102 exceeds a threshold amount, for example, two times. The movable barrier operator 102 may determine the number of activation signals the transmitter has sent to activate the movable barrier operator 102 by reading the activation attempt count provided with each activation signal sent from the transmitter.

If the activation attempt count does not exceed the threshold amount (e.g., two attempts), the movable barrier operator 102 may determine that the transmitter is in close proximity to the movable barrier operator 102. Otherwise, when the threshold is exceeded, the movable barrier operator 102 may determine that the transmitter may be approaching the movable barrier operator 102, but be sending the activation signals from a distance resulting in a number of unsuccessful activation attempts. Where the transmitter is determined to not be in close proximity to the movable barrier operator 102, but approaching the movable barrier operator 102, the movable barrier operator 102 may then provide 760 a prewarning to alert those in proximity to the movable barrier 108 that the movable barrier 108 will be moving and changing states. After the prewarning has been provided, the movable barrier operator 102 may perform 762 the state change operation requested by the transmitter.

If the activation attempt count is less than the threshold amount of activation attempts (e.g., a single attempt), the movable barrier operator 102 may perform 764 the state change operation requested by the transmitter. The movable barrier operator 102 may skip providing a prewarning, determining that the transmitter is in proximity to the movable barrier operator 102 based on the number of activation attempts being less than the threshold amount.

Upon receiving a valid state change command, the movable barrier operator 102 may be configured to continue listening for subsequent state change commands. The movable barrier operator 102 may determine whether the subsequently received state change commands received after the initial state change command are related to the initial state change command, i.e., commands for the same state change operation. The movable barrier operator 102 may determine whether the state change commands are related to the same state change request by comparing the time at which each state change command signal is received. For example, if a series of state change commands are received and the state change commands are spaced apart by a known delay period of the transmitter (e.g., the delay at operation 706 of the transmitter) the movable barrier operator 102 may determine to disregard the subsequently received state change commands. As another example, the state change commands received from the transmitter may all have the same fixed code and rolling/changing code enabling the movable barrier operator 102 to determine the state change commands are all related to the same state change request.

Figure 10A:
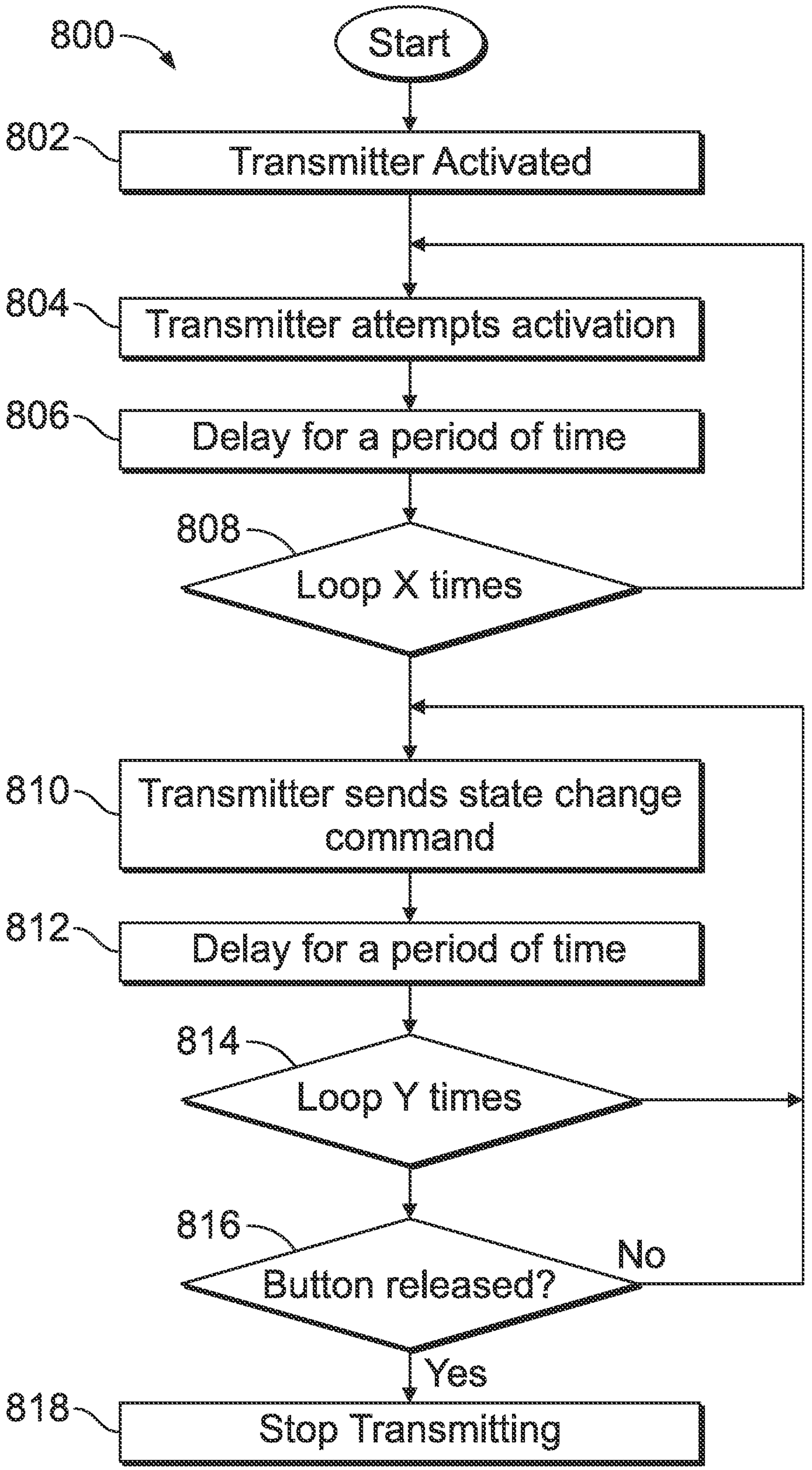
FIG. 10A is a flow diagram of an example of the movable barrier operator sending a state change command from a transmitter, the method including the movable barrier operator determining whether to provide a prewarning according to a second embodiment.
Figure 10B:
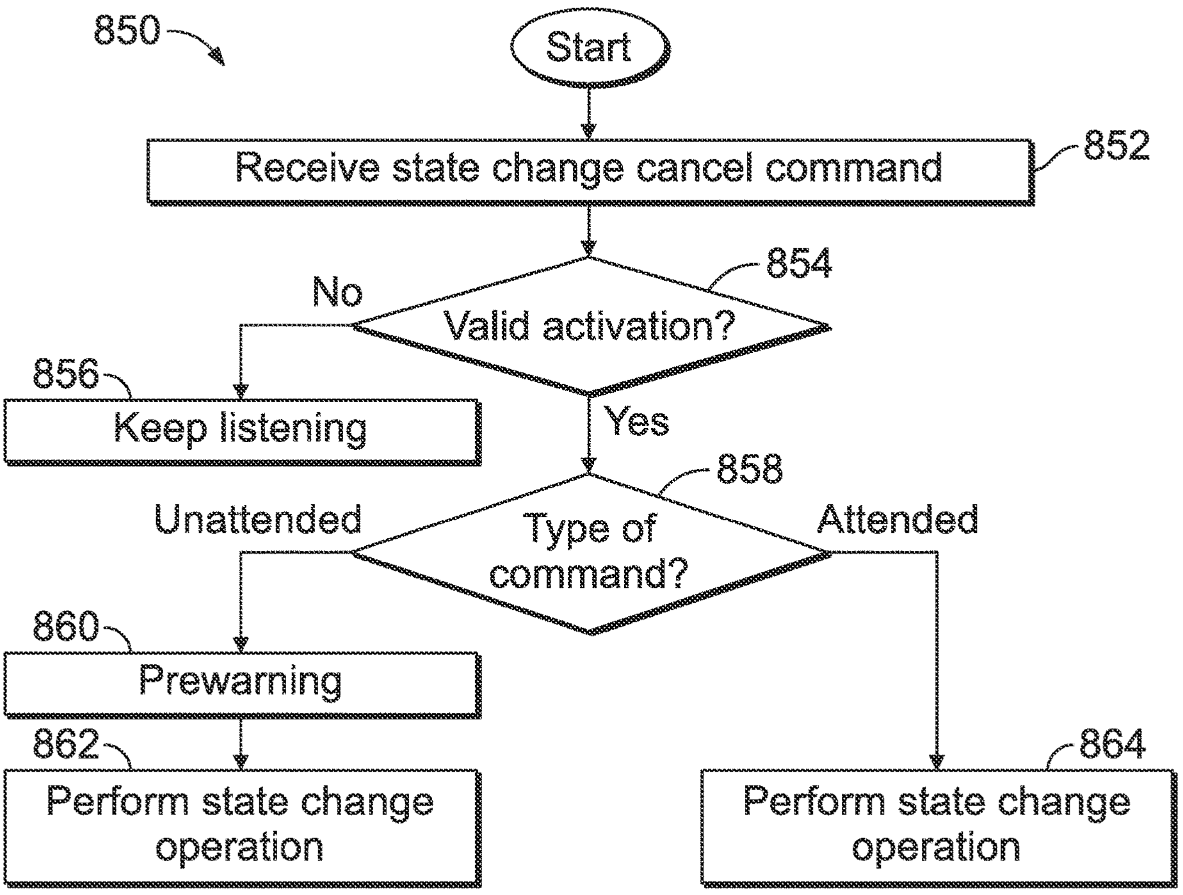
FIG. 10B is a flow diagram of an example method of the movable barrier operator receiving the state change command from the transmitter and determining whether to provide the prewarning at the movable barrier operator according to a second embodiment.

With respect to FIGS. 10A-B, methods 800 and 850 are provided according to another approach to enable a prewarning signal to be provided by the movable barrier operator 102 based on activation commands received from an RF transmitter. Method 800 is performed by the transmitter and begins when the transmitter is activated 802. The transmitter may be activated similar to that described in method 700 above. Upon activation, the transmitter sends 804 an attended command to change the state of an associated movable barrier 108. An attended command may include a state change request whereas unattended commands may include a state change request and command to provide a prewarning signal. The transmitter delays 806 sending a subsequent state change request for a period of time, for example, up to 100 milliseconds. The transmitter keeps count in operation 808 of the number of attended commands sent, updating the count after each attended command is sent by the transmitter. If the number of attended commands determined in operation 808 is less than a threshold amount (e.g., 0 to 2 commands), the transmitter repeats steps 804 and 806 to send another attended command and update the count.

Once the transmitter determines that the number of attended commands sent is at or above the threshold amount, the transmitter sends 810 an unattended command and delays 812 sending subsequent state change commands for a period of time, for example, up to 100 milliseconds. The transmitter keeps count of the number of unattended commands that have been sent. The transmitter determines 814 whether the number of unattended commands sent has reached or exceed a threshold number, for example, zero to 20 times. If the transmitter determines that the unattended command count has not reached or exceeded the threshold number, the transmitter repeats steps 810 and 812 until the number of unattended commands sent reaches or exceeds the threshold number.

Upon determining 814 that the number of unattended commands sent by the transmitter have reached or exceeded the set threshold number, the transmitter may determine 816 whether the transmitter continues to receive input from the user requesting the state change request be sent. For example, the transmitter may determine whether a button of the transmitter is still being pressed or has been released. If the button is still being pressed, or such input is still being received, the transmitter may return to repeat steps 810, 812, and 814 before determining 816 whether the button is still being pressed. If the button is no longer being pressed, or input is no longer being received, the transmitter may stop transmitting 818 and end the process. In some forms, after a period of time, the transmitter may end the process even if the button is still being pressed, e.g., two minutes.

With respect to FIG. 10B, a method 850 corresponding to method 800 is provided for the movable barrier operator 102 to determine whether to provide a prewarning signal before changing the state of the movable barrier 108 in response to a state change request from a transmitter. The movable barrier operator 102 receives 852 a state change command from the transmitter. The movable barrier operator 102 determines 854 whether the state change command is a valid state change command. If the movable barrier operator 102 determines 854 the received state change command is not valid, the movable barrier operator 102 disregards 856 the invalid state change command and continues listening for further command signals.

If the movable barrier operator 102 determines 854 the received state change command is valid, the movable barrier operator 102 determines 856 whether the state change command received is an attended command or an unattended command signal. If the movable barrier operator 102 determines 858 that the valid state change command is an unattended command, the movable barrier operator 102 provides 860 a prewarning signal and changes 862 the state of the movable barrier 108.

If the movable barrier operator 102 determines 858 that the valid state change command is an attended command, the movable barrier operator 102 changes 864 the state of the movable barrier 108. The movable barrier operator 102 may be configured to determine whether two or more state change commands that are received by the movable barrier operator 102 are commands for the same operation, e.g., are sent in response to the same input 802. In one embodiment, the movable barrier operator 102 may make this determination by comparing the fixed code and rolling code of the commands received from the transmitter. If the fixed and rolling codes are the same across the two or more received commands, the movable barrier operator 102 may determine these commands are related and are a command for the same operation or response to the same transmitter activation input.

Figure 11:
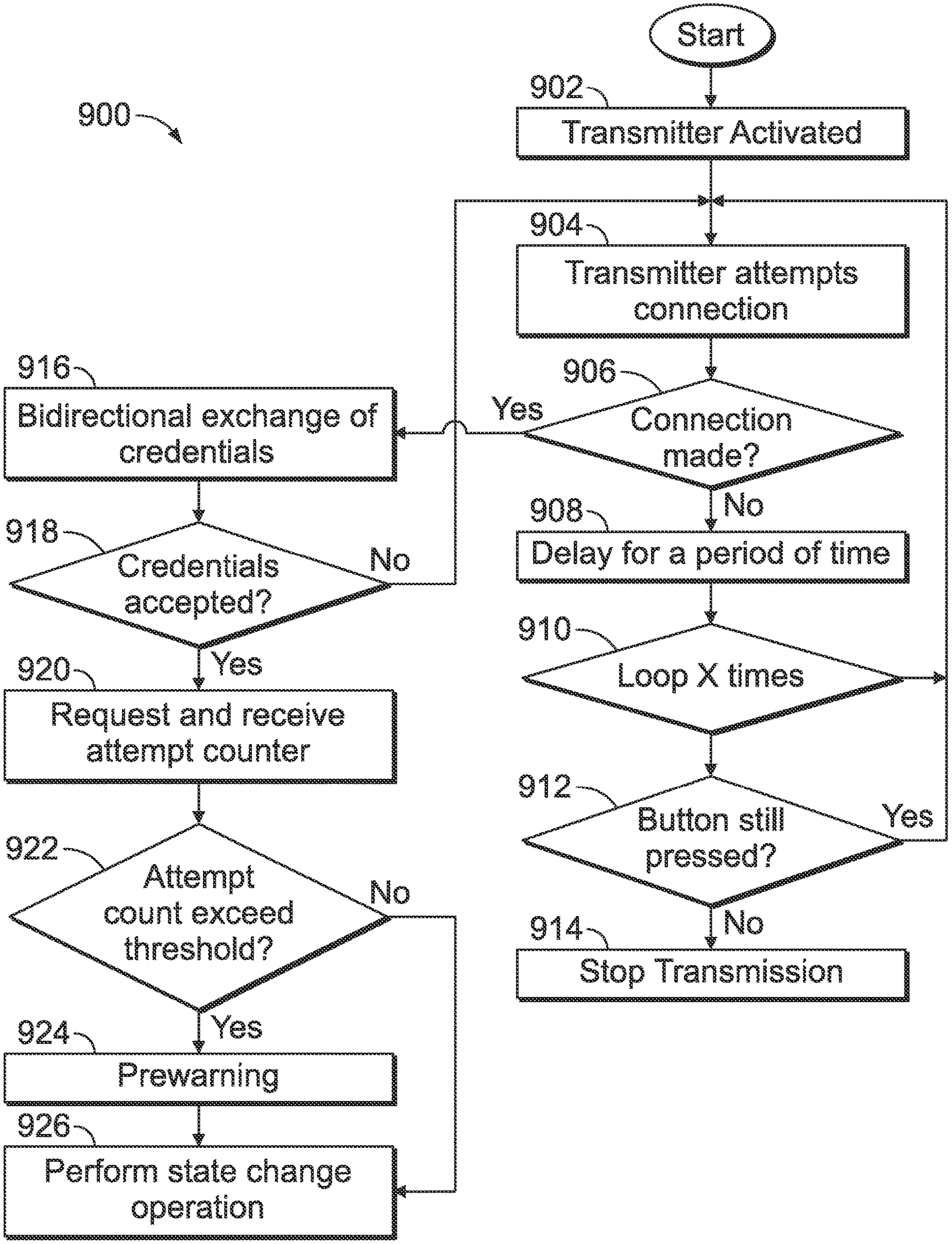
FIG. 11 is a flow diagram of an example method of a transmitter sending a state change request and determining a movable barrier operator whether to provide a prewarning according to a third embodiment.

With respect to FIG. 11, a method 900 is provided for using a state change command from a transmitter to determine whether to provide a prewarning that is similar in many respects to that of methods 700 and 750. In method 900 the transmitter is capable of bidirectional communication with the movable barrier operator 102. The transmitter may be activated 902 as described above in regard to the other methods, for example, when a button of the transmitter is pressed. The transmitter attempts 904 to connect with the movable barrier operator 102. The transmitter may attempt to establish two-way communication with the movable barrier operator 102 to communicate a state change command to the movable barrier operator 102. In some forms, establishing two-way communication is a prerequisite for communicating a valid state change command. The transmitter maintains a connection attempt counter and, upon attempting a connection, adds to the activation attempt counter.

The transmitter determines 906 if the connection has been made with the movable barrier operator 102. The transmitter may make this determination upon receiving a response signal from the movable barrier operator 102 indicating receipt of a transmitter signal.

When the transmitter determines 906 that a connection has not been made, the transmitter delays for a period of time (e.g., up to 100 milliseconds). Upon determining that the attempt to connect with the movable barrier operator 102 is unsuccessful, the transmitter determines 910 if the connection attempt counter has reached or exceeded a predetermined number (e.g., four to 100). If the connection attempt counter has not reached or exceeded the predetermined number, the transmitter may return to step 904 and reattempts connection with the movable barrier operator 102. With each unsuccessful attempt, the activation attempt counter is increased. If the connection attempt counter has reached or exceeded the threshold number, the transmitter may determine 912 whether the input is still being received to send the activation signal, for example, whether the transmitter button is still being pressed. If the input is still being pressed, the transmitter may return to step 904. If the button is no longer being pressed, or input is no longer being received to continue attempting to connect, the transmitter may stop 914 attempting to connect with the movable barrier operator 102 and end the process.

When the transmitter determines 906 that a connection has been made between the transmitter and the movable barrier operator, the transmitter exchanges 916 credentials with the movable barrier operator 102. The transmitter may send a signal including a credential to the movable barrier operator 102 indicative that the transmitter is authorized to control the movable barrier operator 102. The credential may include a fixed code and/or a rolling/changing code for example. The transmitter may further receive a credential from the movable barrier operator 102 indicating to the transmitter which movable barrier operator 102 the transmitter has established a connection with. In some forms, if the transmitter verifies that the movable barrier operator 102 is the movable barrier operator 102 the transmitter sought to establish a connection with, the transmitter may then communicate a state change command to the movable barrier operator 102.

Similarly, the movable barrier operator 102, upon establishing a connection with a transmitter, participates in the bidirectional exchange 916 of credentials. The movable barrier operator 102 determines 918 whether to accept the credentials provided by the transmitter. The movable barrier operator 102 may determine whether to accept the credentials provided by the transmitter by, for example, comparing the received credential with a credential stored in an associated memory. In another form, the movable barrier operator 102 may use other cryptographic or decryption techniques to process the received credential to confirm whether the transmitter is authorized to control the movable barrier operator 102. If the movable barrier operator does not accept the credential, the movable barrier operator 102 may communicate to the transmitter that the credential has not been accepted. In other forms, the movable barrier operator 102 disregards the transmitter and discontinues communication with the transmitter. Where the credential is not accepted by the movable barrier operator 102, the transmitter may return to step 904 and repeat the process to attempt connection with the movable barrier operator 102.

Upon the movable barrier operator 102 accepting the credential, the movable barrier operator 102 requests 920 the connection attempt counter from the transmitter. The transmitter, upon receiving the request for the connection attempt counter, may communicate the connection attempt count to the movable barrier operator 102. The movable barrier operator 102 receives 920 the connection attempt counter from the transmitter. The movable barrier operator 102 then determines 922 whether the connection attempt counter is less than a threshold amount (e.g., 2 to 20). If the movable barrier operator 102 determines 922 the attempt counter has reached or exceeded the threshold amount, the movable barrier operator 102 may provide 924 a prewarning signal and then carry out the command to change 926 the state of the movable barrier 108. The connection attempt count may be higher where the transmitter is communicating over a greater distance and/or where the path between the transmitter and the movable barrier operator 102 is obstructed thus indicating the transmitter is likely distant from or not present at the movable barrier 108. Due to the increased likelihood that the transmitter is not present at the movable barrier 108 when requesting a state change, the prewarning may be provided before the state change operation is performed. Where the movable barrier operator 102 determines 922 the attempt count is less than the threshold amount, the movable barrier operator 102 may carry out the command and change 926 the state of the movable barrier 108 without providing the prewarning signal.

Certain actions and/or operations described herein may be described or depicted in a particular order of occurrence while those skilled in the art will understand that such specificity with respect to sequence is not actually required. Moreover, certain actions and/or operations may be described as being performed at a particular device while those having skill in the art will understand that such actions and/or operations may be performed at other devices of or related to the system.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A method of controlling a movable barrier operator, the method comprising:

at an in-vehicle device:

controlling, via a processor of the in-vehicle device, a communication circuitry of the in-vehicle device to communicate a prewarning request to the movable barrier operator;

receiving, via the communication circuitry, a wireless signal indicating communication of a state change request received at the movable barrier operator, the state change request configured to cause the movable barrier operator to move a movable barrier from a first state toward a second state;

determining, via the processor, whether to present an option to cancel the state change request based upon a predetermined set of rules;

presenting, via a user interface of the in-vehicle device, a notification of the communication of the state change request and the option to cancel the state change request;

receiving, via the user interface of the in-vehicle device, a user input to cancel the state change request; and effecting cancelation of the state change request in response to the user interface receiving the user input to cancel the state change request.

2. The method of claim 1 wherein receiving the wireless signal indicating communication of the state change request includes receiving information regarding a device that communicated the state change request; and wherein presenting the notification of the communication of the state change request includes presenting the information regarding the device that communicated the state change request.

3. The method of claim 1 further comprising initiating a timer in response to presenting the notification, wherein the option to cancel the state change request terminates upon expiration of the timer.

4. The method of claim 1 further comprising delaying transmission of the state change request in response to the determining.

5. The method of claim 1 further comprising:

receiving location data from a location sensor of the in-vehicle device; and communicating, via the communication circuitry of the in-vehicle device, the state change request to the movable barrier operator based at least in part on the location data.

6. The method of claim 5 wherein communicating the state change request to the movable barrier operator includes communicating a message to a server computer via a wireless network.

7. The method of claim 1 further comprising communicating, via the communication circuitry of the in-vehicle device, the state change request to the movable barrier operator; and wherein the prewarning request is communicated to the movable barrier operator to cause the movable barrier operator to provide a prewarning while the option to cancel the state change request is presented via the user interface of the in-vehicle device.

8. The method of claim 1 further comprising controlling the communication circuitry of the in-vehicle device to communicate the state change request to the movable barrier operator in response to a vehicle that includes the in-vehicle device crossing a geofence.

9. The method of claim 1 wherein effecting cancelation of the state change request includes communicating a cancelation signal to the movable barrier operator, the cancelation signal configured to cause the movable barrier operator to maintain the movable barrier in the first state or return the movable barrier to the first state.

10. The method of claim 1 wherein presenting the notification of the communication of the state change request and the option to cancel the state change request includes reconfiguring a display of the user interface.

11. The method of claim 1 wherein presenting the notification of the communication of the state change request and the option to cancel the state change request includes displaying a virtual button on a display of the user interface.

12. The method of claim 11 wherein receiving the user input to cancel the state change request includes detecting a user input at a portion of the display associated with the virtual button.

13. The method of claim 1 wherein presenting the notification of the communication of the state change request and the option to cancel the state change request includes changing a graphical user interface from a first configuration to a second configuration, the method further comprising:

changing the graphical user interface from the second configuration to the first configuration upon effecting cancelation of the state change request.

14. The method of claim 1 wherein effecting cancelation includes controlling the communication circuitry of the in-vehicle device to transmit a radio frequency communication to the movable barrier operator.

15. The method of claim 1 wherein effecting cancelation includes controlling the communication circuitry to communicate a message to a server computer over the internet, the message configured to cause the server computer to communicate a control command to the movable barrier operator.

16. An in-vehicle device for controlling a movable barrier operator, the in-vehicle device comprising:

a user interface;

communication circuitry; and a processor operatively connected to the user interface and the communication circuitry, the processor configured to:

cause the communication circuitry to communicate a prewarning request to the movable barrier operator;

receive through the communication circuitry a wireless signal indicating communication of a state change request received at the movable barrier operator, the state change request configured to cause the movable barrier operator to move a movable barrier from a first state to a second state;

determine whether to present the option to cancel the state change request based upon a predetermined set of rules;

control the user interface to present a notification of the communication of the state change request and the option to cancel the state change request upon the communication circuitry receiving the wireless signal;

receive through the user interface a user input to cancel the state change request; and control the communication circuitry to effect cancelation of the state change request in response to the user interface receiving the user input to cancel the state change request.

17. The in-vehicle device of claim 16 wherein the processor is configured to receive through the communication circuitry the wireless signal including receiving information regarding a device that communicated the state change request; and wherein the processor is configured to control the user interface to present the notification of the communication of the state change request and the option to cancel the state change request including presenting the information regarding the device that communicated the state change request.

18. The in-vehicle device of claim 16 wherein the processor is configured to initiate a timer in response to presenting the notification, wherein the option to cancel the state change request terminates upon expiration of the timer.

19. The in-vehicle device of claim 16 further comprising delaying transmission of the state change request in response to a result of the processor determining whether to present the option.

20. The in-vehicle device of claim 16 further comprising a location sensor operatively connected to the processor; and wherein the processor is configured to control the communication circuitry to communicate the state change request to the movable barrier operator based at least in part upon location data from the location sensor.

21. The in-vehicle device of claim 16 wherein the processor is configured to control the communication circuitry to communicate the state change request to the movable barrier operator; and wherein the prewarning request is communicated to the movable barrier operator to cause the movable barrier operator to provide a prewarning while the option to cancel the state change request is presented via the user interface of the in-vehicle device.

22. The in-vehicle device of claim 16 wherein the processor is configured to control the communication circuitry to effect cancelation of the state change request including communicating a cancelation signal to the movable barrier operator, the cancelation signal configured to cause the movable barrier operator to maintain the movable barrier in the first state or return the movable barrier to the first state.

23. The in-vehicle device of claim 16 wherein the user interface includes a touch sensitive display; and wherein the processor is configured to control the user interface to present the option to cancel the state change request including the touch sensitive display displaying a virtual button.

* * * * *